United States Patent
Choi et al.

(10) Patent No.: US 9,049,363 B2
(45) Date of Patent: Jun. 2, 2015

(54) DIGITAL PHOTOGRAPHING APPARATUS, METHOD OF CONTROLLING THE SAME, AND COMPUTER-READABLE STORAGE MEDIUM

(75) Inventors: Jun-ho Choi, Seoul (KR); Jin-ho Choi, Seoul (KR); Na-ri Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 13/295,303

(22) Filed: Nov. 14, 2011

(65) Prior Publication Data

US 2012/0274796 A1    Nov. 1, 2012

(30) Foreign Application Priority Data

Apr. 29, 2011    (KR) .................. 10-2011-0040977

(51) Int. Cl.
*H04N 5/222*    (2006.01)
*H04N 5/232*    (2006.01)

(52) U.S. Cl.
CPC ................................ *H04N 5/232* (2013.01)

(58) Field of Classification Search
None
See application file for complete search history.

(56) References Cited

U.S. PATENT DOCUMENTS

| | | | |
|---|---|---|---|
| 2003/0064757 A1* | 4/2003 | Yamadera et al. | 455/566 |
| 2005/0272484 A1 | 12/2005 | Griffin | |
| 2008/0252753 A1* | 10/2008 | Ejima et al. | 348/231.99 |
| 2012/0127189 A1* | 5/2012 | Park et al. | 345/581 |
| 2012/0127332 A1* | 5/2012 | Park et al. | 348/222.1 |
| 2012/0198525 A1* | 8/2012 | Ihara et al. | 726/5 |
| 2013/0057934 A1* | 3/2013 | Satomi et al. | 358/537 |
| 2013/0121614 A1* | 5/2013 | Intwala | 382/280 |
| 2013/0145270 A1* | 6/2013 | Piran et al. | 715/720 |
| 2013/0242158 A1* | 9/2013 | Yoshino et al. | 348/333.01 |

FOREIGN PATENT DOCUMENTS

| | | | | |
|---|---|---|---|---|
| EP | 1 626 572 A1 * | 5/2004 | | H04N 5/225 |
| EP | 1 555 795 A | 7/2005 | | |
| EP | 1 626 572 A1 | 2/2006 | | |
| JP | 2010-160581 A | 7/2010 | | |

OTHER PUBLICATIONS

English translation of EP 1 626 572 A1 included.*
Search Report established for EP 12155110.5 (Aug. 9, 2012).
Search Report established for EP 12155110.5 (Nov. 23, 2012).

* cited by examiner

*Primary Examiner* — Lin Ye
*Assistant Examiner* — John H Morehead, III
(74) *Attorney, Agent, or Firm* — Drinker Biddle & Reath LLP

(57) ABSTRACT

Embodiments of the invention provide a digital photographing apparatus including a user interface provider for providing a user interface including: a display region for displaying a live-view image or a reproduced image; a first region for providing at least one pre-set menu; and a second region for providing at least one user set menu set by a user.

23 Claims, 22 Drawing Sheets

DIGITAL PHOTOGRAPHING APPARATUS, METHOD OF CONTROLLING THE SAME, AND COMPUTER-READABLE STORAGE MEDIUM

CROSS-REFERENCE TO RELATED PATENT APPLICATION

This application claims the priority benefit of Korean Patent Application No. 10-2011-0040977, filed on Apr. 29, 2011, in the Korean Intellectual Property Office, the disclosure of which is incorporated herein in its entirety by reference.

BACKGROUND

1. Field of the Invention

Embodiments of the invention generally relate to a digital photographing apparatus, a method of controlling the same, and a computer-readable storage medium for executing the method.

2. Description of the Related Art

Digital photographing apparatuses generate a captured image by receiving an optical signal and converting the optical signal to an electrical signal. A user may change photograph setting values and photographic effects of a digital photographing apparatus and apply desired setting values and effects to a captured image. Recently, a user interface for adjusting photograph setting values is provided in digital photographing apparatuses.

SUMMARY

Embodiments of the invention provide a user interface capable of performing various operations such as photographing, controlling of photograph setting values, and reproduction on a single screen.

Embodiments of the invention also provide a user interface for actively changing menus of the user interface according to setting values input by a user.

According to an aspect of the invention, there is provided a digital photographing apparatus including a user interface provider for providing a user interface including: a display region for displaying a live-view image or a reproduced image; a first region for providing at least one pre-set menu; and a second region for providing at least one user set menu set by a user.

The first region may include: a first sub-region including at least one of a first selection menu for selecting a capturing mode or a reproduction mode, and a second selection menu for selecting a still image capturing mode or a video capturing mode; and a second sub-region including at least one pre-set menu according to settings of the selection menus in the first sub-region.

Types of the at least one user set menu to be provided in the second region may be determined according to menu setting in the first region.

The first region may include a photographic effect setting menu for setting a photographic effect, and the second region may include: a third sub-region for providing the at least one user set menu determined according to the set photographic effect; and a fourth sub-region for providing the at least one user set menu disposed regardless of the photographic effect.

The photographic effect may be a lens effect or a filter effect to be applied to a captured image, and the at least one user set menu in the third sub-region may be a menu for selecting a photograph setting value to be set in the set photographic effect.

The at least one user set menu in the fourth sub-region may be at least one of or a combination of a smart shutter for performing photographing with photograph setting values pre-selected by the user, a reset button for setting photograph setting values to initial values, or a folder selection menu for selecting and changing a folder in which a captured image is stored or that is searched for a reproduced image.

The digital photographing apparatus may further include: a capturing unit for concentrating an optical signal and converting the optical signal to an electrical signal; and a capturing controller for changing parameters of the capturing unit to pre-set values according to the photographic effect setting of the user.

The first region may include the first selection menu for selecting capturing mode or reproduction mode, the first selection menu may display at least one image stored in the digital photographing apparatus in the capturing mode and display the live-view image in the reproduction mode, and the display region may display the live-view image in the capturing mode and display the reproduced image in the reproduction mode.

The user interface provider may provide at least one menu associated with the reproduced image in the reproduced image when the reproduced image is displayed in the display region.

The digital photographing apparatus may further include a user interface editor providing an editing interface for editing at least one of the first region or the second region, wherein, when the at least one of the first region or the second region is edited, the user interface editor provides an addable candidate menu to the at least one of the first region or the second region in the display region and changes menus in the at least one of the first region or the second region according to a user input.

The user interface editor may determine and provide the candidate menu according to a setting value of the at least one menu in the first region.

The user interface may be provided through a touch screen.

According to another aspect of the invention, there is provided a method of controlling a digital photographing apparatus including a user interface, a screen of the user interface including a display region, a first region, and a second region, the method including: displaying a live-view image or a reproduced image in the display region; providing at least one pre-set menu in the first region; and providing at least one user set menu set by a user in the second region.

The first region may include: a first sub-region including at least one of a first selection menu for selecting a capturing mode or a reproduction mode, or a second selection menu for selecting a still image capturing mode or a video capturing mode; and a second sub-region including at least one pre-set menu according to settings of the selection menus in the first sub-region.

The method may further include determining types of the at least one user set menu to be provided in the second region according to menu setting in the first region.

The method may further include providing a photographic effect setting menu for setting a photographic effect in the first region, wherein the second region includes: a third sub-region for providing the at least one user set menu determined according to the set photographic effect; and a fourth sub-region for providing the at least one user set menu disposed regardless of the photographic effect.

The photographic effect may be a lens effect or a filter effect to be applied to a captured image, and the at least one user set menu in the third sub-region may be a menu for selecting a photograph setting value to be set in the set photographic effect.

The at least one user set menu in the fourth sub-region may be at least one of or a combination of a smart shutter for performing photographing with photograph setting values pre-selected by the user, a reset button for setting photograph setting values to initial values, and a folder selection menu for selecting or changing a folder in which a captured image is stored or that is searched to locate a reproduced image.

The method may further include changing parameters of a capturing unit to pre-set values according to the photographic effect setting of the user.

The first region may include the first selection menu for selecting capturing mode or reproduction mode, the first selection menu may display at least one image stored in the digital photographing apparatus in the capturing mode and display the live-view image in the reproduction mode, and the display region may display the live-view image in the capturing mode and display the reproduced image in the reproduction mode.

The method may further include providing at least one menu associated with the reproduced image overlaid on the reproduced image when the reproduced image is displayed in the display region.

The method may further include: providing an editing interface for editing at least one of the first region and the second region; when at least one of the first region and the second region is edited, providing an addable candidate menu to at least one of the first region or the second region in the display region; and changing menus in the at least one of first region or the second region according to a user input.

The method may further include determining the candidate menu according to a setting value of the at least one menu in the first region.

The user interface may be provided through or presented on a touch screen.

According to another aspect of the invention, there is provided a computer-readable storage medium storing computer program codes that, when executed, cause a digital photographing apparatus to present a user interface including a display region, a first region, and a second region by at least: displaying a live-view image or a reproduced image in the display region; providing at least one pre-set menu in the first region; and providing at least one user set menu set by a user in the second region.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The description below and the attached drawings are provided to understand operations according to the invention.

Details of the same may be omitted when such details are easily implemented or readily known by one of ordinary skill in the art.

In addition, the specification and the attached drawings are provided not for purposes of limitation, and the scope of the invention is defined by the appended claims. The terms used in the specification should be understood with respect to the meanings and concepts most appropriate to the technical spirit of the invention.

The invention will now be described more fully with reference to the accompanying drawings, in which exemplary embodiments of the invention are shown.

Figure 1:
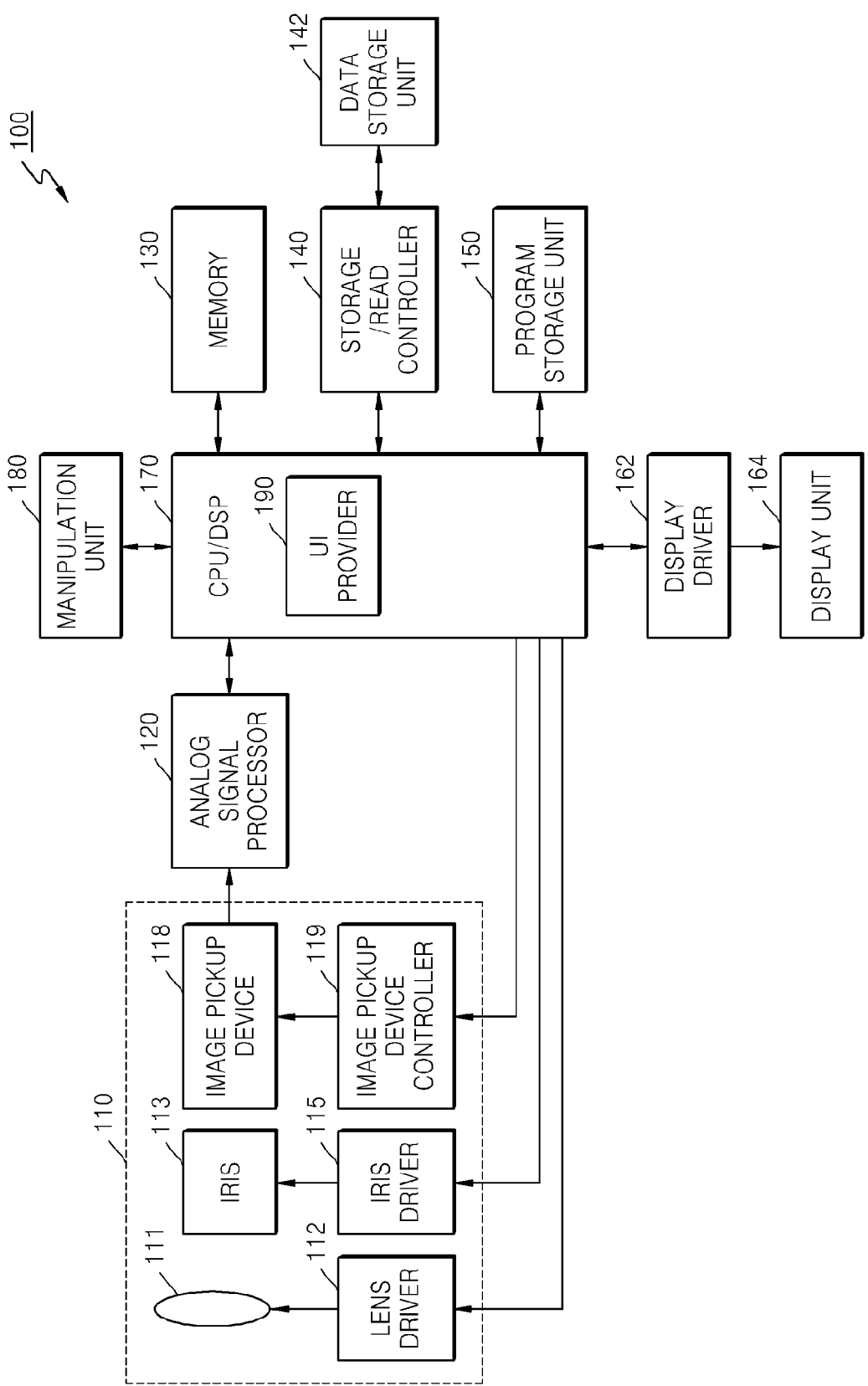
FIG. 1 is a block diagram showing an illustrative configuration of a digital photographing apparatus, according to an exemplary embodiment of the invention.

FIG. 1 is a block diagram showing an illustrative configuration of a digital photographing apparatus 100, according to an exemplary embodiment of the invention.

The digital photographing apparatus 100 may include a photographing unit 110, an analog signal processor 120, a memory 130, a storage/read controller 140, a data storage unit 142, a program storage unit 150, a display driver 162, a display unit 164, a central processing unit (CPU)/digital signal processor (DSP) 170, a manipulation unit 180, and a UI provider 190.

The overall operation of the digital photographing apparatus 100 is controlled by the CPU/DSP 170. The CPU/DSP 170 provides control signals to a lens driver 112, an iris driver 115, and an image pickup device controller 119 for an operation of each component.

The photographing unit 110 is a component for generating an electrical signal representative of incident light and includes a lens 111, the lens driver 112, an iris 113, the iris driver 115, an image pickup device 118, and the image pickup device controller 119.

The lens 111 may include a plurality of groups of lenses. A position of the lens 111 is controlled by the lens driver 112. The lens driver 112 controls a position of the lens 111 according to a control signal provided from the CPU/DSP 170.

The iris driver 115 controls a degree of opening/closing of the iris 113, thereby controlling the intensity of light incident on the image pickup device 118.

An optical signal transmitted through the lens 111 and the iris 113 forms an image of an object on a light receiving side of the image pickup device 118. The image pickup device 118 may be a Charge Coupled Device (CCD) image sensor or a Complementary Metal Oxide Semiconductor Image Sensor (CIS) that converts an optical signal to an electrical signal. Sensitivity of the image pickup device 118 can be controlled by the image pickup device controller 119. The image pickup device controller 119 can control the image pickup device 118 according to a control signal automatically generated by a real-time input image signal or a control signal manually input by an operation by a user via the manipulation unit 180.

A light-exposure time of the image pickup device 118 is controlled by a shutter (not shown). The shutter may include a mechanical shutter for adjusting incident light by moving a cover and an electronic shutter for controlling light-exposure by providing an electrical signal to the image pickup device 118.

The analog signal processor 120 performs noise reduction processing, gain adjustment, waveform standardization, analog-to-digital conversion processing, etc. with respect to an analog signal generated and provided from the image pickup device 118.

A signal processed by the analog signal processor 120 may be directly input to the CPU/DSP 170 or via the memory 130. Herein, the memory 130 operates as a main memory of the digital photographing apparatus 100 and temporarily stores information needed during an operation of the CPU/DSP 170. The program storage unit 150 stores programs, such as an operating system for driving the digital photographing apparatus 100 and an application system.

The digital photographing apparatus 100 includes the display unit 164 for displaying an operation state of the digital photographing apparatus 100 or information regarding an image captured by the digital photographing apparatus 100. The display unit 164 may provide visual information and auditory information to the user. To provide the visual information, the display unit 164 may include, for example, a Liquid Crystal Display (LCD) panel, or an Organic Light Emitting Diode (OLED) panel. The display unit 164 may be a touch screen for recognizing a touch input.

The display driver 162 generates and provides a driving signal to the display unit 164.

The CPU/DSP 170 processes an input image signal and controls corresponding components of the digital photographing apparatus 100 according to an input signal from the outside. The CPU/DSP 170 can reduce noise of input image data and perform image signal processing for image quality improvement such as Gamma correction, color filter array interpolation, color matrix, color correction, and color enhancement. In addition, the CPU/DSP 170 can generate an image file by compressing image data generated from the image signal processing for image quality improvement or restore the image data from the image file. A compression format of an image may be a reversible format or an irreversible format. Examples of a proper format for a still image are a Joint Photographic Experts Group (JPEG) format and a JPEG 2000 format. In addition, when a moving picture is recorded, a video file may be generated by compressing a plurality of frames under the Moving Picture Experts Group (MPEG) standard. An image file may be generated, for example, in accordance with the Exchangeable image file format (Exif) standard.

Image data output from the CPU/DSP 170 is input to the storage/read controller 140 directly or via the memory 130, wherein the storage/read controller 140 stores the image data in the data storage unit 142 automatically or according (e.g., in response to) to a signal from the user. The storage/read controller 140 may read data regarding an image from an image file stored in the data storage unit 142 and provide the read data to the display driver 162 via the memory 130 or another path to display an image on the display unit 164. The data storage unit 142 may be detachable from or permanently installed in the digital photographing apparatus 100.

The CPU/DSP 170 may also perform obscurity processing, color processing, blur processing, edge emphasis processing, image analysis processing, image recognition processing, image effect processing, etc. The image recognition processing may include face recognition processing and scene recognition processing. The CPU/DSP 170 may also perform display image signal processing to display an image on the display unit 164. For example, brightness level adjustment, color correction, contrast adjustment, contour emphasis adjustment, screen division processing, creation of a character image, and image composition processing may be performed. The CPU/DSP 170 may be connected to an external monitor, perform predetermined image signal processing, and transmit processed image data to the external monitor to display a corresponding image on the external monitor.

In addition, the CPU/DSP 170 may generate control signals for controlling Auto Focusing (AF), a zoom change, a focus change, and Auto Exposure (AE) correction by executing programs stored in the program storage unit 150 or using a separate module, provide control signals to the iris driver 115, the lens driver 112 and the image pickup device controller 119, and generally control operations of components in the digital photographing apparatus 100.

Through the manipulation unit 180, a control signal can be input by the user. The manipulation unit 180 may include various functional buttons, such as a shutter-release button for inputting a shutter-release signal to take a picture by exposing the image pickup device 118 to light for a predetermined time, a power button for inputting a control signal to control ON/OFF power, a zoom button for widening an angle of view and narrowing the angle of view according to an input, a mode selection button, and other photograph setting value adjustment buttons. The manipulation unit 180 may be implemented by any type of button, keyboard, touch pad, touch screen, and remote control that enables the user to input a signal therethrough.

The UI provider 190 provides UIs according to the embodiments of the invention. The UI provider 190 may provide a UI in a form of providing (e.g., presenting) a UI screen on the display unit 164. The display unit 164 may include a touch screen, and UIs may be controlled by a touch screen input. Alternatively, UIs may be controlled by an operation key input through the manipulation unit 180.

Hereinafter, embodiments in which UIs are provided through a touch screen and controlled by a user input through the touch screen are described.

Figure 2:
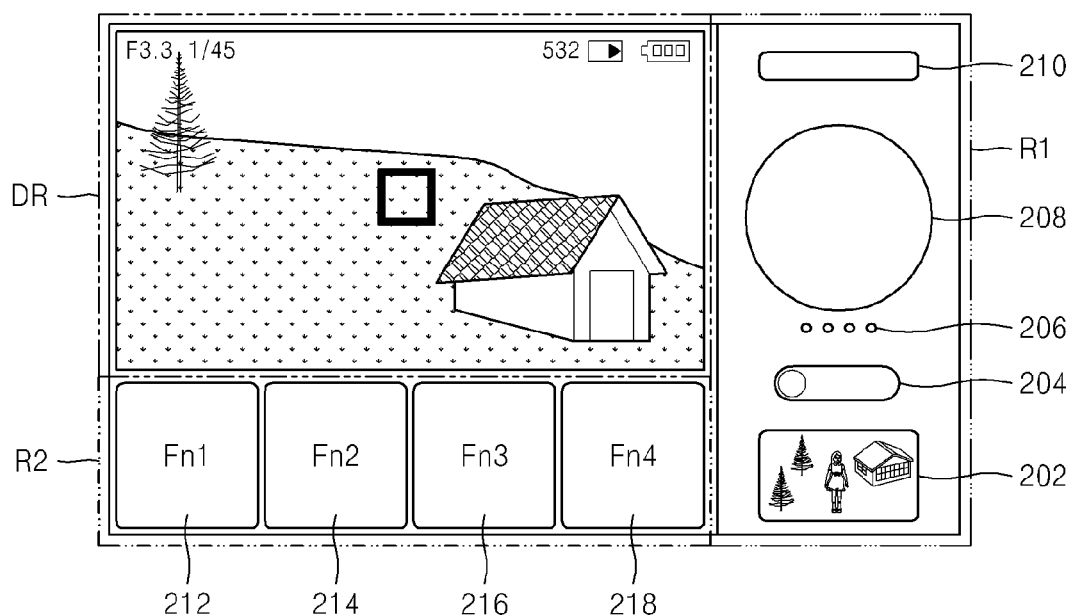
FIG. 2 illustrates a user interface (UI) according to an exemplary embodiment of the invention.

FIG. 2 illustrates a UI according to an exemplary embodiment of the invention.

Referring to FIG. 2, the UI includes a display region DR, a first region R1, and a second region R2.

The display region DR is used to provide a live-view image or a reproduced image. For example, the display region DR may be used to display a live-view image in a capturing mode, and display a reproduced image in a reproduction mode. Together with a live-view image or a reproduced image, remaining battery information, an indicator for indicating a current mode, current photograph setting values, and information regarding the reproduced image may be displayed in the display region DR.

The first region R1 provides (e.g., presents) pre-set types of menus. The types of menus provided in the first region R1 cannot be changed by the user. However, the user may be able to change positions of the menus provided in the first region R1, shapes thereof, and parameters associated with them. According to an embodiment, the types of menus provided in the first region R1 may be changed according to whether a current mode is the capturing mode or the reproduction mode, or whether the capturing mode is a still image capturing mode or a video capturing mode.

According to the current embodiment, the first region R1 may include a first selection menu 202 for selecting capturing mode or reproduction mode, a second selection menu 204 for selecting still image capturing mode or video capturing mode, a photographic effect setting menu 208 for setting a photographic effect, an indicator 206 for indicating a currently set photographic effect, and a stroboscope setting menu 210. As shown in FIG. 2, a predetermined image may be displayed in the first selection menu 202. For example, while displaying a live-view image in the display region DR in the capturing mode, a predetermined reproduced image or the latest captured image may be displayed in the first selection menu 202; and while displaying a reproduced image in the display region DR in the reproduction mode, a live-view image may be displayed in the first selection menu 202. To do this, the photographing unit 110 may keep generating a live-view image to provide the live-view image to the CPU/DSP 170 even in the reproduction mode.

The second region R2 provides at least one user set menu 212, 214, 216, and 218 set or selected by the user. The user set menus 212, 214, 216, and 218 may be edited by the user through an editing interface. The user set menus 212, 214, 216, and 218 may be menus set by the user to view in the UI from among, for example, an exposure value setting menu, a white balance setting menu, an image pickup device sensitivity setting menu, a face detection setting menu, a resolution setting menu, a photometry setting menu, a timer setting menu, a driving method setting menu, a sharpness setting menu, a contrast setting menu, a color saturation degree setting menu, and a successive photograph setting menu.

Figure 3:
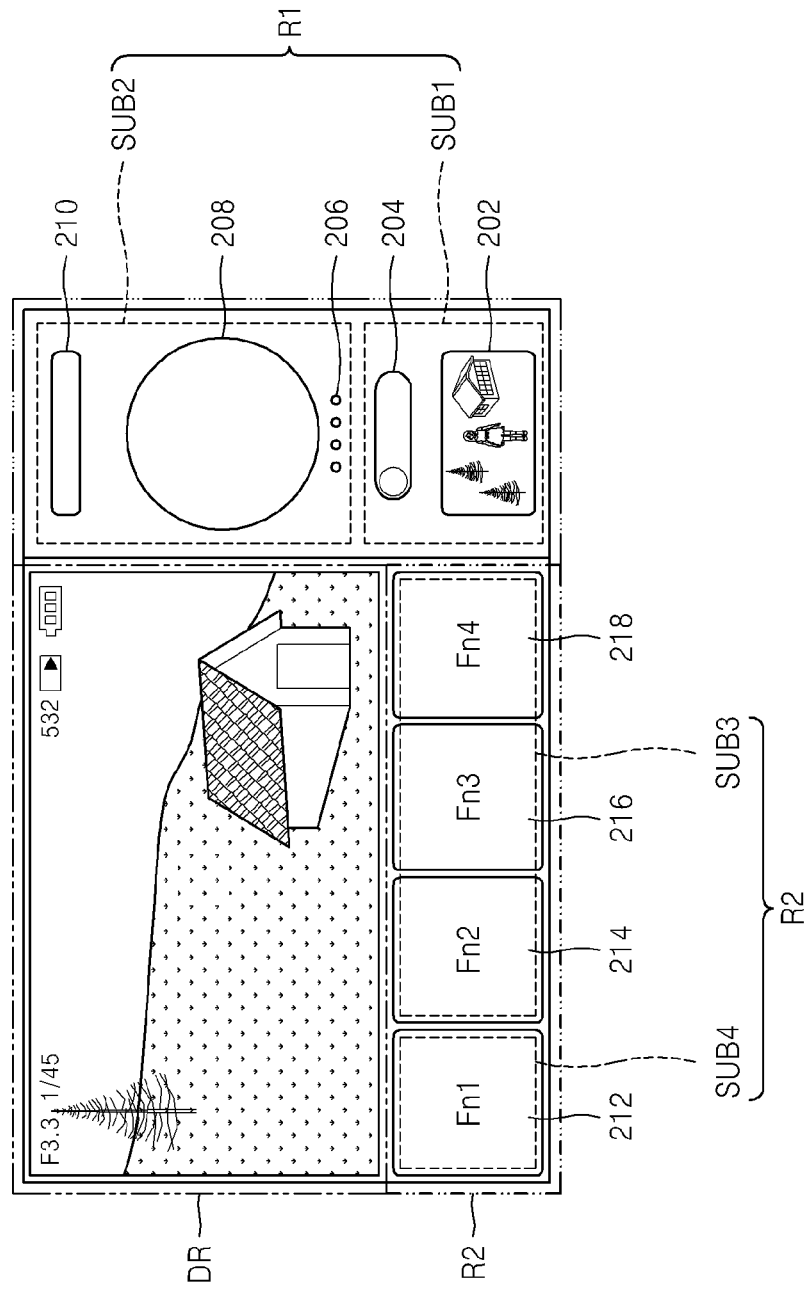
FIG. 3 illustrates a UI screen, according to an exemplary embodiment of the invention.

FIG. 3 illustrates a UI screen according to an exemplary embodiment of the invention.

Referring to FIG. 3, the first region R1 includes a first sub-region SUB1 and a second sub-region SUB2, and the second region R2 includes a third sub-region SUB3 and a fourth sub-region SUB4.

The first sub-region SUB1 provides menus, types or selectable parameters, types of which cannot be changed by the user. The first sub-region SUB1 provides, for example, the first selection menu 202 and the second selection menu 204.

The second sub-region SUB2 provides menus, types of which cannot be changed by the user, but selectable parameter types of which can be changed by the user. The types of the menus provided in the second sub-region SUB2 may vary according to setting values of the menus in the first sub-region SUB1. For example, the types of the menus provided in the second sub-region SUB2 may vary according to whether a current mode is capturing mode or reproduction mode, or whether the capturing mode is still image capturing mode or video capturing mode.

The third sub-region SUB3 provides menus, types of which can be changed by the user. According to an embodiment, types of menus to be provided in the third sub-region SUB3 may vary according to setting values of the menus in the first sub-region SUB1 or the second sub-region SUB2.

For example, the user may set types of menus to be provided in the third sub-region SUB3 according to setting values of the menus in the first sub-region SUB1 or the second sub-region SUB2, wherein the UI provider 190 may provide user set menus in the third sub-region SUB3 according to setting values of the menus in the first sub-region SUB1 or the second sub-region SUB2.

As another example, the user may set types of menus to be provided in the third sub-region SUB3 regardless of setting values of the menus in the first sub-region SUB1 or the second sub-region SUB2, wherein the UI provider 190 may extract and provide only menus that can be currently utilized by a user according to current setting values of the menus in the first sub-region SUB1 or the second sub-region SUB2 from among the menus to be provided in the third sub-region SUB3 by the user. For example, when the user cannot set an exposure value in a first photographic effect set in the photographic effect setting menu 208 in the second sub-region SUB2 although the user has set the exposure value setting menu to be disposed in the third sub-region SUB3, the UI provider 190 may provide the exposure value setting menu in the third sub-region SUB3 in regard to other photographic effects and may not provide the exposure value setting menu when the a first photographic effect is set.

Types of the user set menus 214, 216, and 218 provided in the third sub-region SUB3 may vary according to whether capturing mode or reproduction mode is set in the first selection menu 202 or whether the still image capturing mode or the video capturing mode is set in the second selection menu 204.

The fourth sub-region SUB4 provides the at least one user set menus 212 set by the user regardless of setting values of the menus in the first sub-region SUB1 or the second sub-region SUB2. Types of the at least one user set menus 212 that can be provided in the fourth sub-region SUB4 are, for example, a smart shutter, a reset menu, and a folder selection menu.

The smart shutter may be used to generate a captured image by applying all photograph setting values frequently used by the user. When the user takes a picture with the smart shutter, the user may take a picture with photograph setting values pre-allocated to the smart shutter regardless of whatever photograph setting values are currently set in the menus in the second sub-region SUB2 and the third sub-region SUB3. In addition, the user may be able to directly (e.g., immediately) take a picture with the smart shutter in reproduction mode.

The reset menu is used to initialize setting values of the menus in the second sub-region SUB2 and the third sub-region SUB3. For example, the user may select the reset menu to initialize photograph setting values set in the second sub-region SUB2 and the third sub-region SUB3 to pre-set (e.g., pre-selected) values.

The folder selection menu is used to select a folder in which a captured image is stored. In addition, the user may select a folder from which an image to be reproduced is selected, using the folder selection menu.

According to an embodiment, the user may select a menu to be provided in the fourth sub-region SUB4 through an operation such as a scroll on the fourth sub-region SUB4.

The invention is not limited to the current embodiment in which all of the first sub-region SUB1, the second sub-region SUB2, the third sub-region SUB3, and the fourth sub-region SUB4 are provided, and various combinations of these regions are possible. For example, the fourth sub-region SUB4 may be omitted. In addition, the user may set to omit any one of the third sub-region SUB3 and the fourth sub-region SUB4, or may freely set the number of menus provided in the third sub-region SUB3 and the fourth sub-region SUB4. In addition, the user may adjust sizes of the third sub-region SUB3 and the fourth sub-region SUB4. Furthermore, the user may change positions of the third sub-region SUB3 and the fourth sub-region SUB4.

Figure 4:
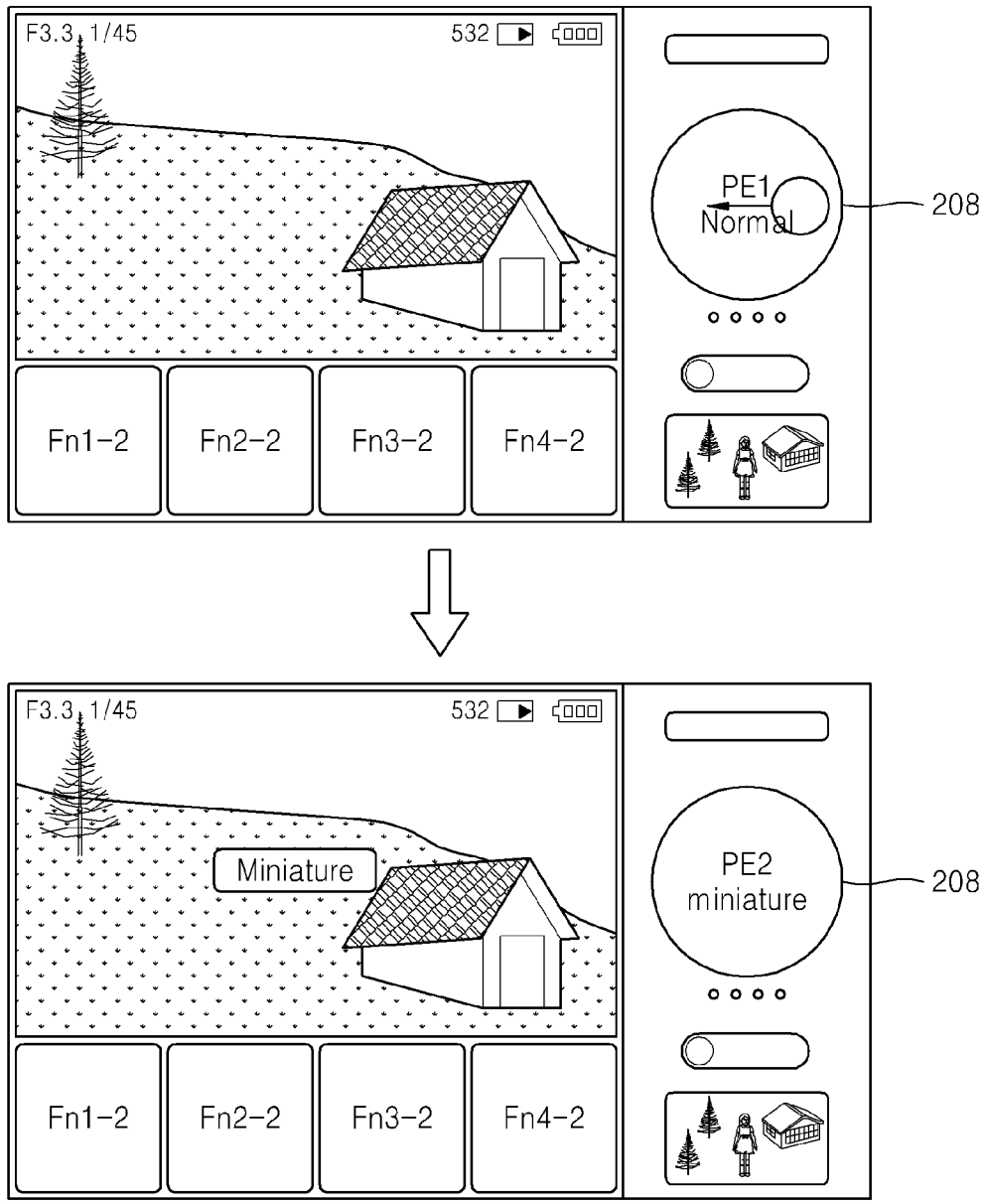
FIG. 4 illustrates UI screens for changing a photographic effect in a photographic effect setting menu, according to an exemplary embodiment of the invention.

FIG. 4 illustrates UI screens for changing a photographic effect in the photographic effect setting menu 208, according to an exemplary embodiment of the invention.

According to the current embodiment of the invention, as shown in FIG. 4, by dragging the photographic effect setting menu 208 in a right or left direction on a touch screen, a photographic effect to be applied to a live-view image or a reproduced image may be selected (e.g., controlled). Examples of a photographic effect, which can be set with the photographic effect setting menu 208, are no effect, a miniature effect, a vignetting effect, a soft focus effect, a cinema effect, a halftone dot effect, a sketch effect, a fisheye lens effect, a defog effect, a classic effect, a retro effect, and a negative effect.

Figure 5:
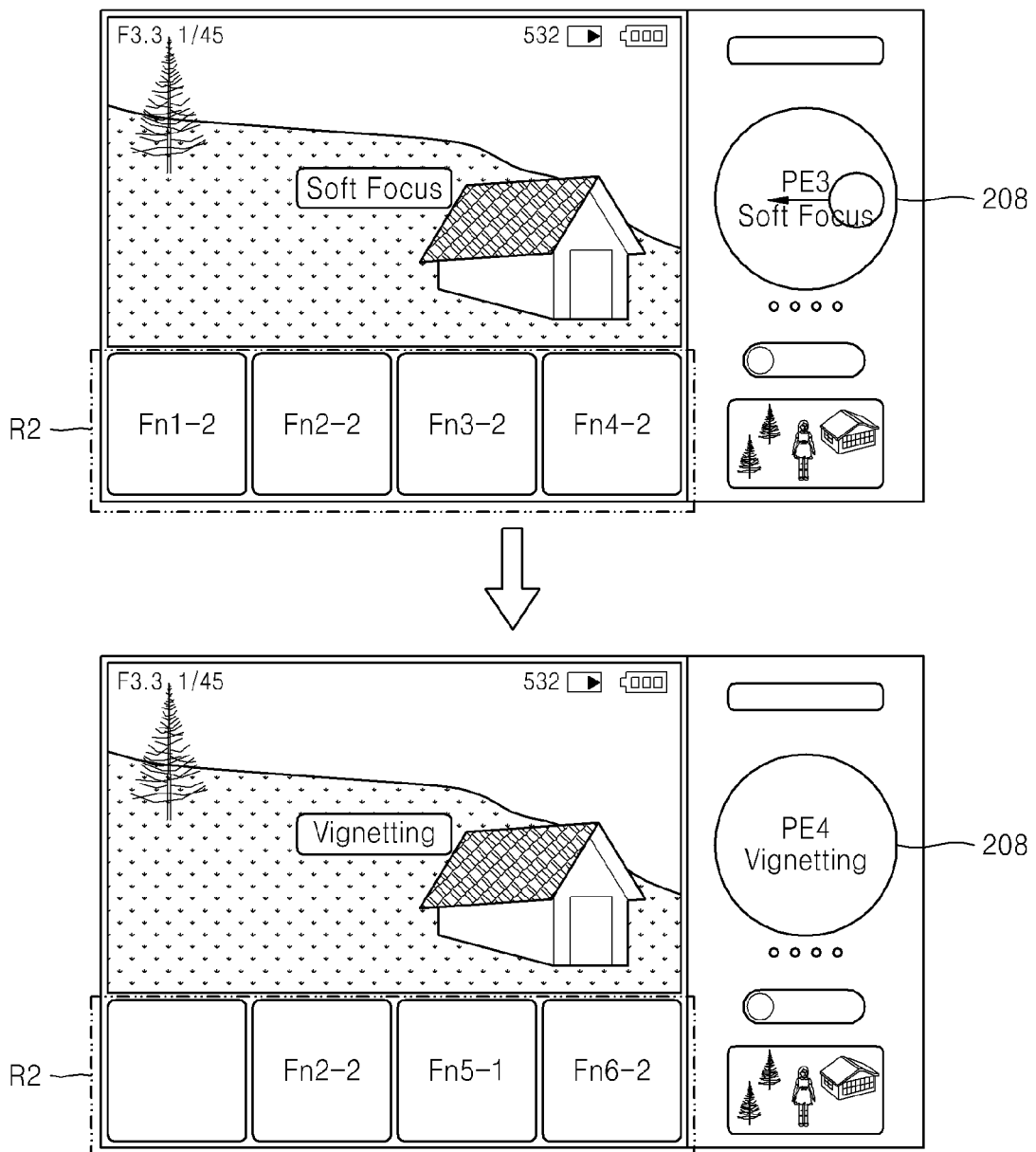
FIG. 5 illustrates UI screens for changing a photographic effect in a photographic effect setting menu, according to another exemplary embodiment of the invention.

FIG. 5 illustrates UI screens for changing a photographic effect in the photographic effect setting menu 208, according to another exemplary embodiment of the invention.

According to the current embodiment of the invention, types of user set menus provided in the second region R2 may vary according to a setting value in the photographic effect setting menu 208. In the embodiment of FIG. 5, when the soft focus effect is set in the photographic effect setting menu 208, an Fn1 menu, an Fn2 menu, an Fn3 menu, and an Fn4 menu are provided in the second region R2; and if the setting value in the photographic effect setting menu 208 is changed to the vignetting effect, the Fn2 menu, an Fn5 menu, and an Fn6 menu may be provided in the second region R2.

In the specification, menu names are indicated as Fn1, Fn2, and the like, and parameters settable in each menu are indicated as Fn1-1, Fn1-2, and the like. Fn1-1 and Fn1-2 denote parameters settable in the Fn1 menu, and Fn2-1 and Fn2-2 denote parameters settable in the Fn2 menu. The parameters Fn1-1, Fn2-2, and others shown in FIG. 5 are parameters currently set in their respective menus.

Figure 6:
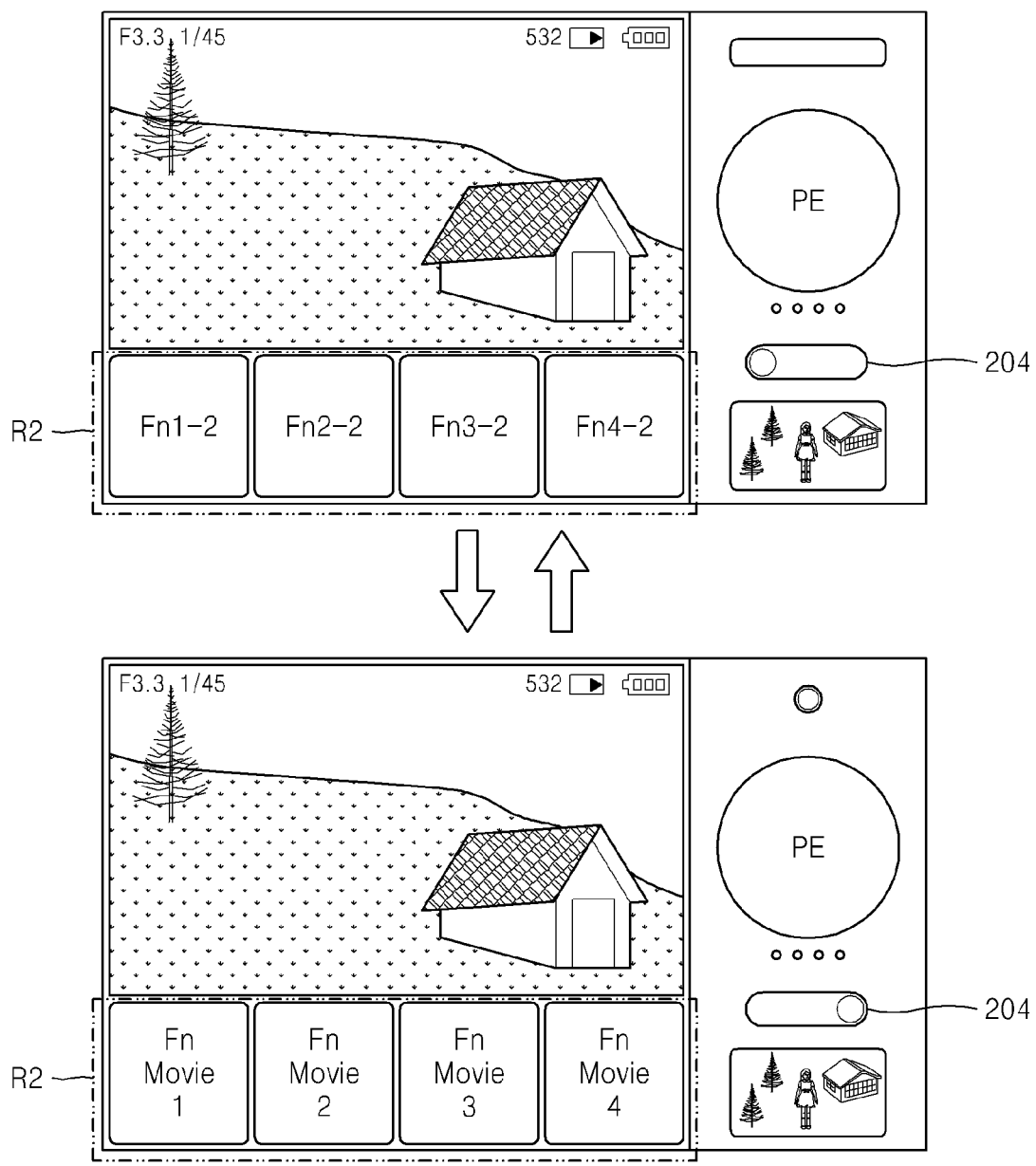
FIG. 6 illustrates UI screens when setting of a second selection menu is changed, according to an exemplary embodiment of the invention.

FIG. 6 illustrates UI screens when setting of the second selection menu 204 is changed, according to an exemplary embodiment of the invention.

According to the current embodiment of the invention, types of user set menus provided in the second region R2 are changed according to whether in still image capturing mode or video capturing mode. As shown in FIG. 6, the Fn1, Fn2, Fn3, and Fn4 menus may be provided in the second region R2 in still image capturing mode, and if the user drags or touches the second selection menu 204 to change still image capturing mode to video capturing mode, Fn Movie 1, Fn Movie 2, Fn Movie 3, and Fn Movie 4 may be provided in the second region R2.

Figure 7:
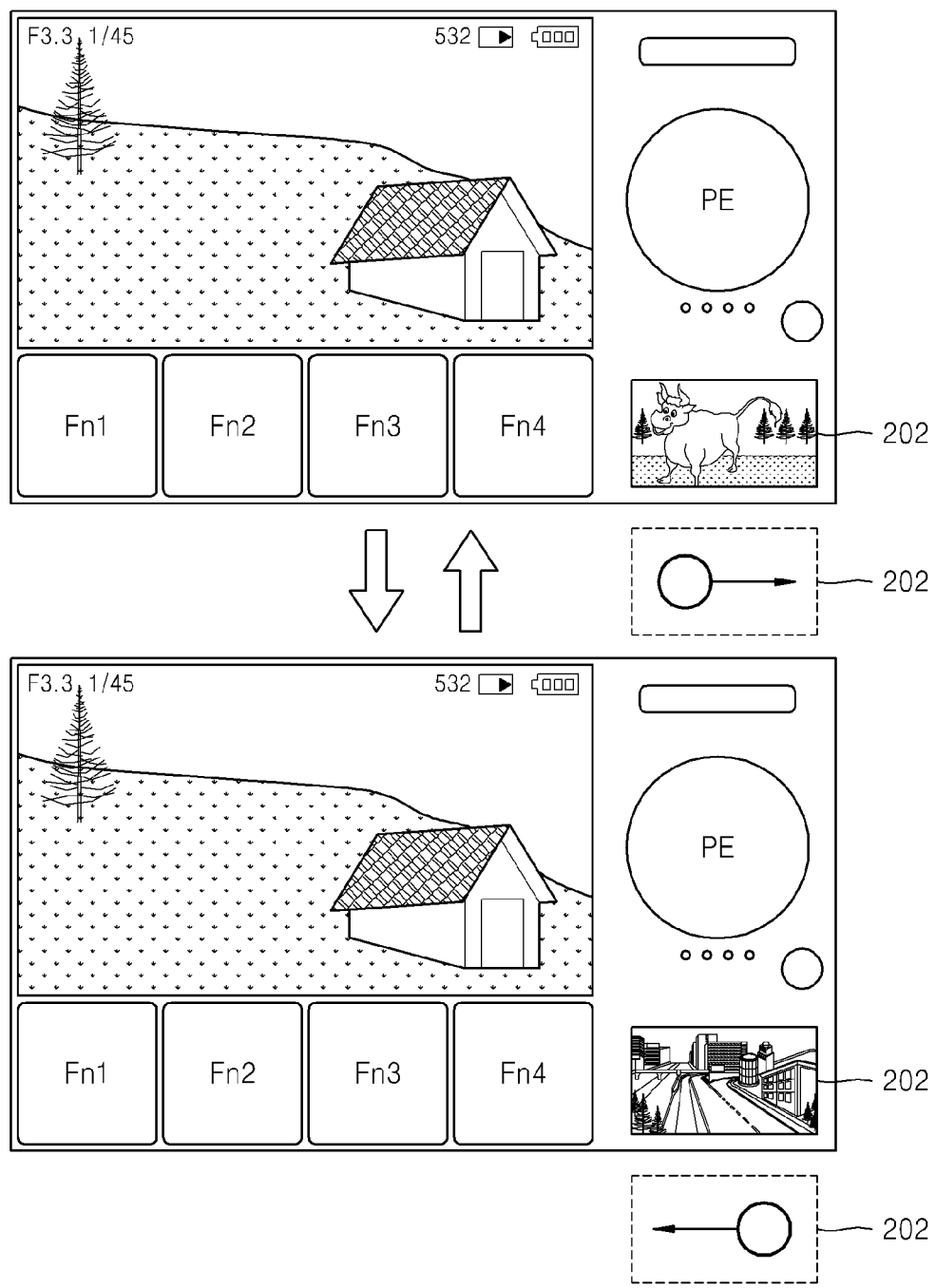
FIG. 7 illustrates UI screens for controlling a first selection menu, according to an exemplary embodiment of the invention.

FIG. 7 illustrates UI screens for controlling the first selection menu 202, according to an exemplary embodiment of the invention.

According to the current embodiment of the invention, by dragging the first selection menu 202 through the touch screen while a predetermined reproduced image is being displayed in the first selection menu 202, a reproduced image to be displayed in the first selection menu 202 may be selected. The user may easily preview a reproduced image even in capturing mode, using this function.

Figure 8:
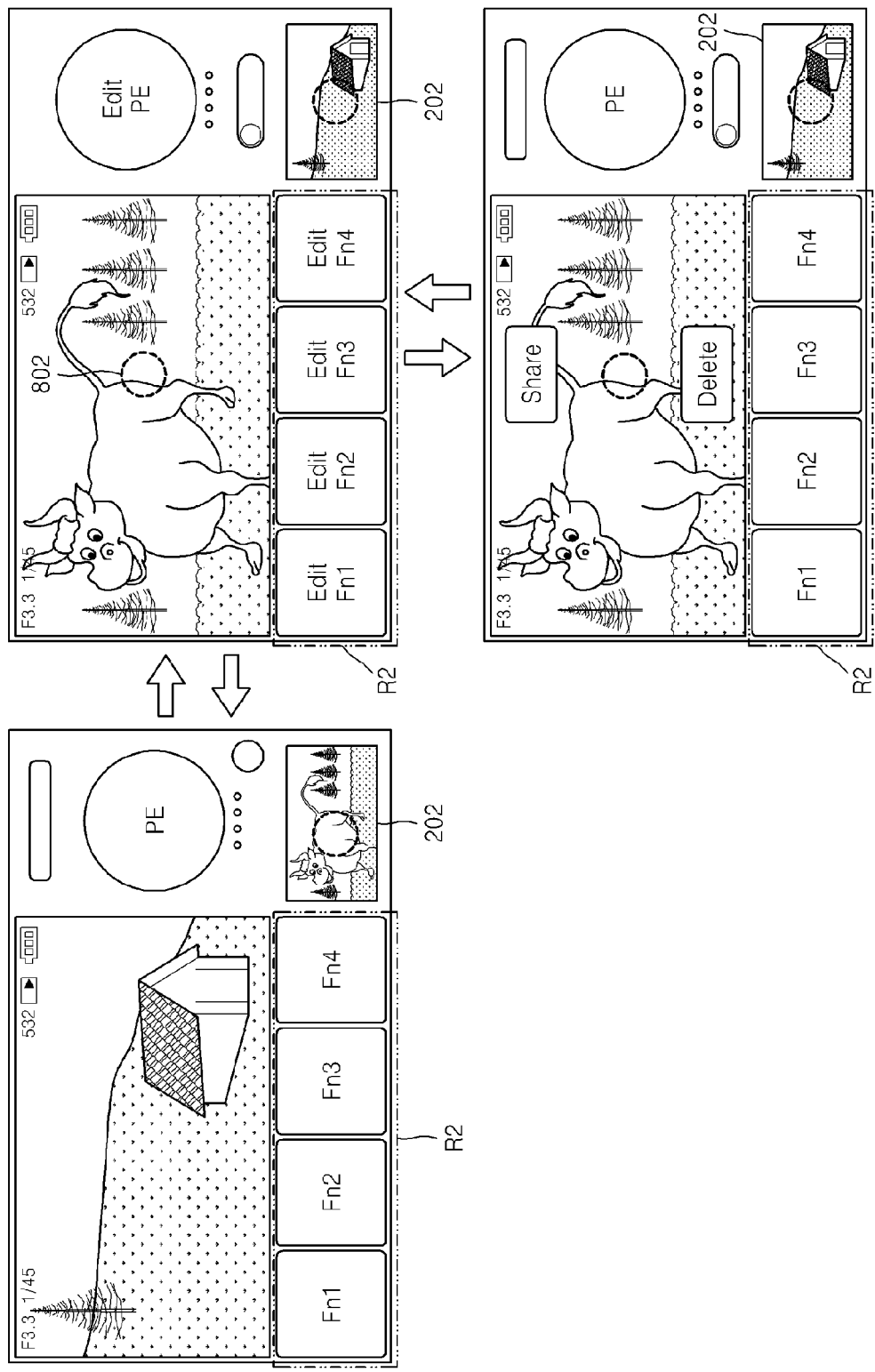
FIG. 8 illustrates UI screens for switching between a capturing mode and a reproduction mode using the first selection menu of FIG. 7, according to an exemplary embodiment of the invention.

FIG. 8 illustrates UI screens for switching between capturing mode and reproduction mode using the first selection menu 202, according to an exemplary embodiment of the invention.

According to the current embodiment of the invention, types of menus provided in the second region R2 may vary according to whether capturing mode or reproduction mode is set in the first selection menu 202. For example, as shown in FIG. 8, when capturing mode is set, the Fn1, Fn2, Fn3, and Fn4 menus may be provided in the second region R2, and if the user gives a touch or a long touch to the first selection menu 202 to set reproduction mode, Edit Fn1, Edit Fn2, Edit Fn3, and Edit Fn4 menus may be provided in the second region R2. In addition, if the user touches a predetermined region 802 in the display region DP in reproduction mode, predetermined menus may be displayed on top of a reproduced image displayed in the display region DP as shown in FIG. 8.

Figure 9:
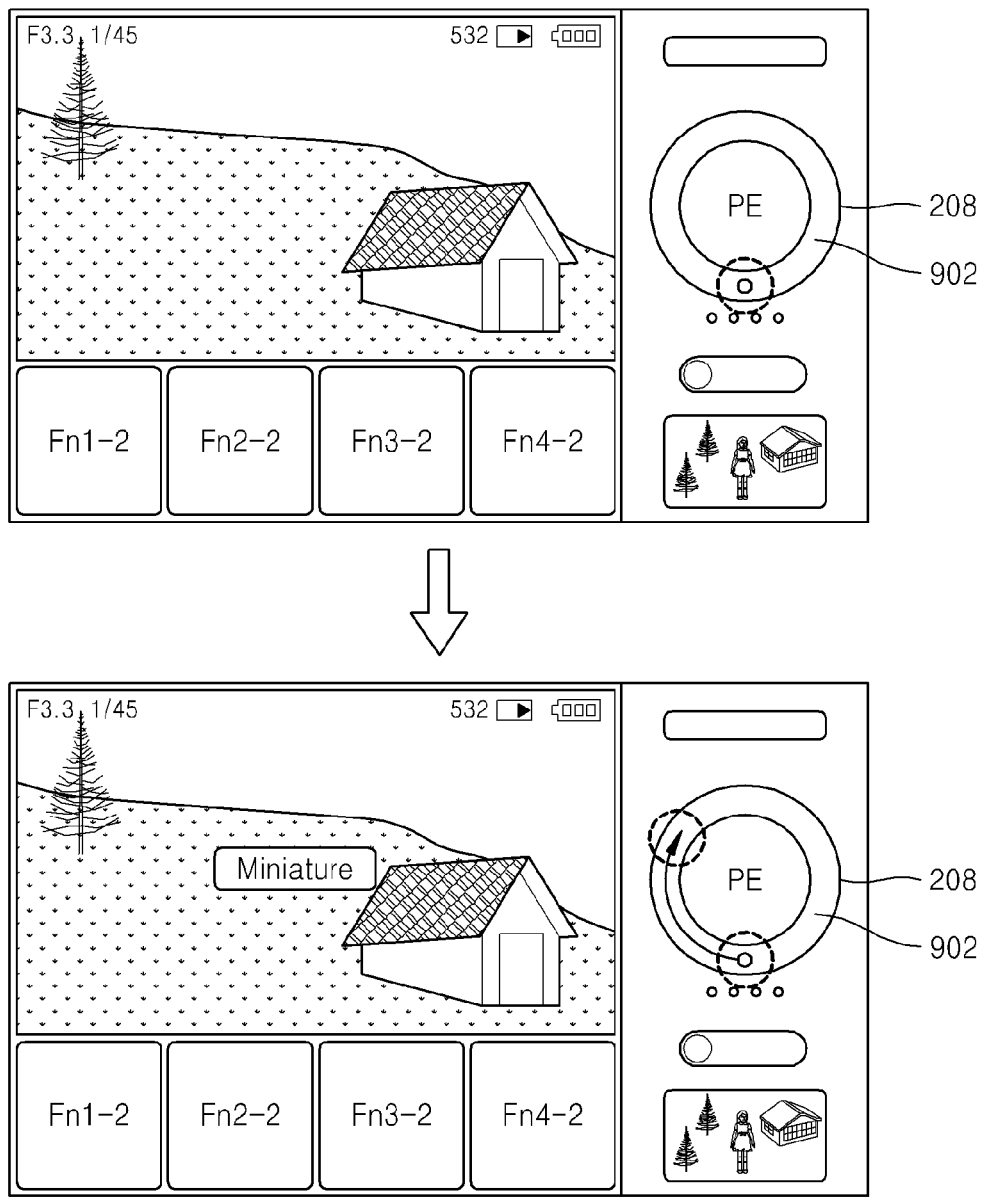
FIG. 9 illustrates UI screens for adjusting the intensity of a photographic effect using the photographic effect setting menu of FIG. 4, according to an exemplary embodiment of the invention.

FIG. 9 illustrates UI screens for adjusting the intensity of a photographic effect using the photographic effect setting menu 208, according to an exemplary embodiment of the invention.

According to the current embodiment of the invention, the photographic effect setting menu 208 may include a photographic effect intensity setting menu 902. The photographic effect intensity denotes a degree of applying a photographic effect to a live-view image or a reproduced image. For example, the user may touch the photographic effect intensity setting menu 902 to enable the photographic effect intensity setting menu 902, and drag the photographic effect intensity setting menu 902 along a shape thereof while touching the photographic effect intensity setting menu 902 to adjust the photographic effect intensity, as depicted in FIG. 9.

Figure 10:
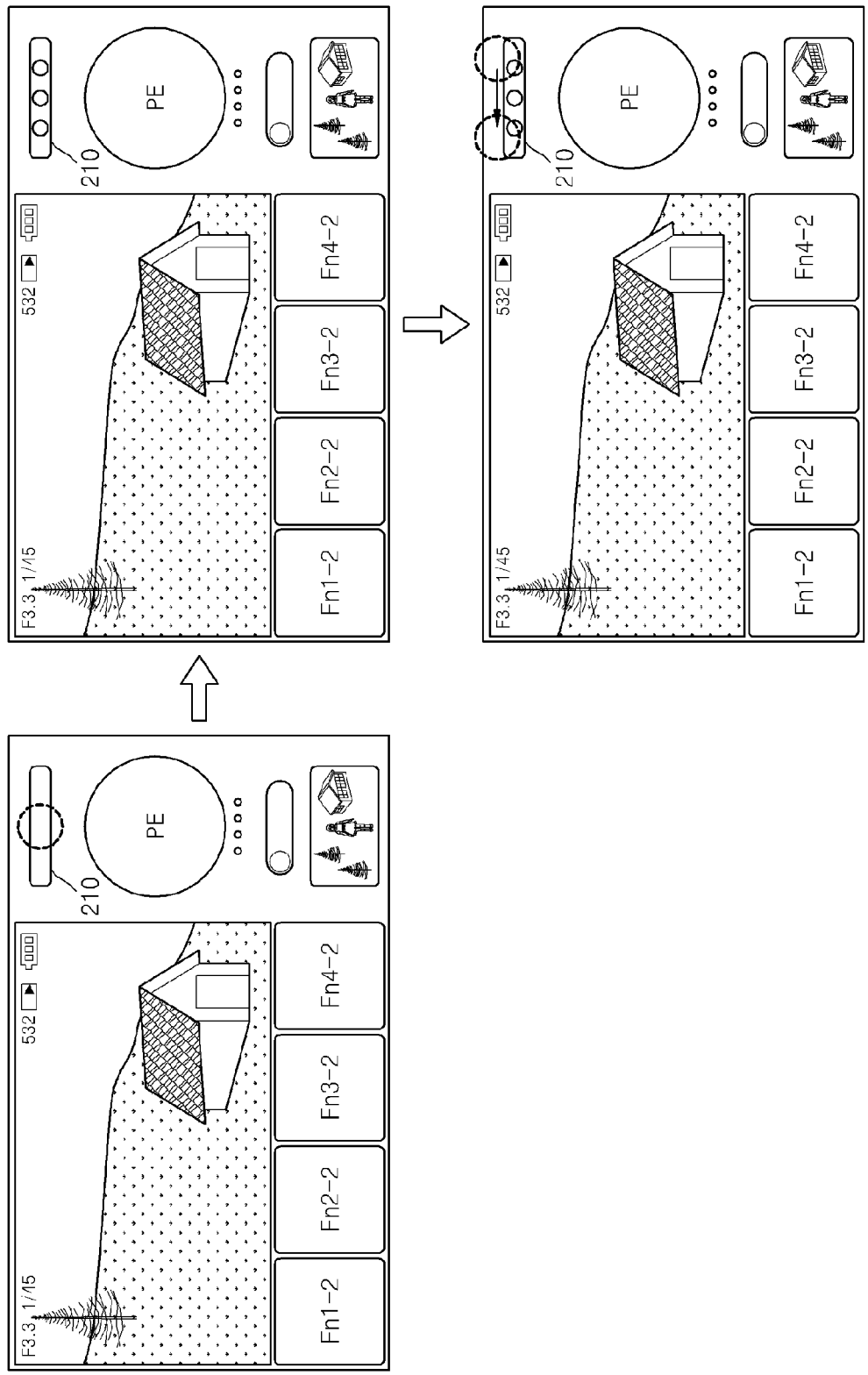
FIG. 10 illustrates UI screens for operating a stroboscope menu, according to an exemplary embodiment of the invention.

FIG. 10 illustrates UI screens for operating the stroboscope menu 210, according to an exemplary embodiment of the invention.

The user may touch the stroboscope menu 210 to enable the stroboscope menu 210, and touch or drag the stroboscope menu 210 to turn a stroboscope on/off or adjust the intensity of the stroboscope, as depicted in FIG. 10.

Figure 11:
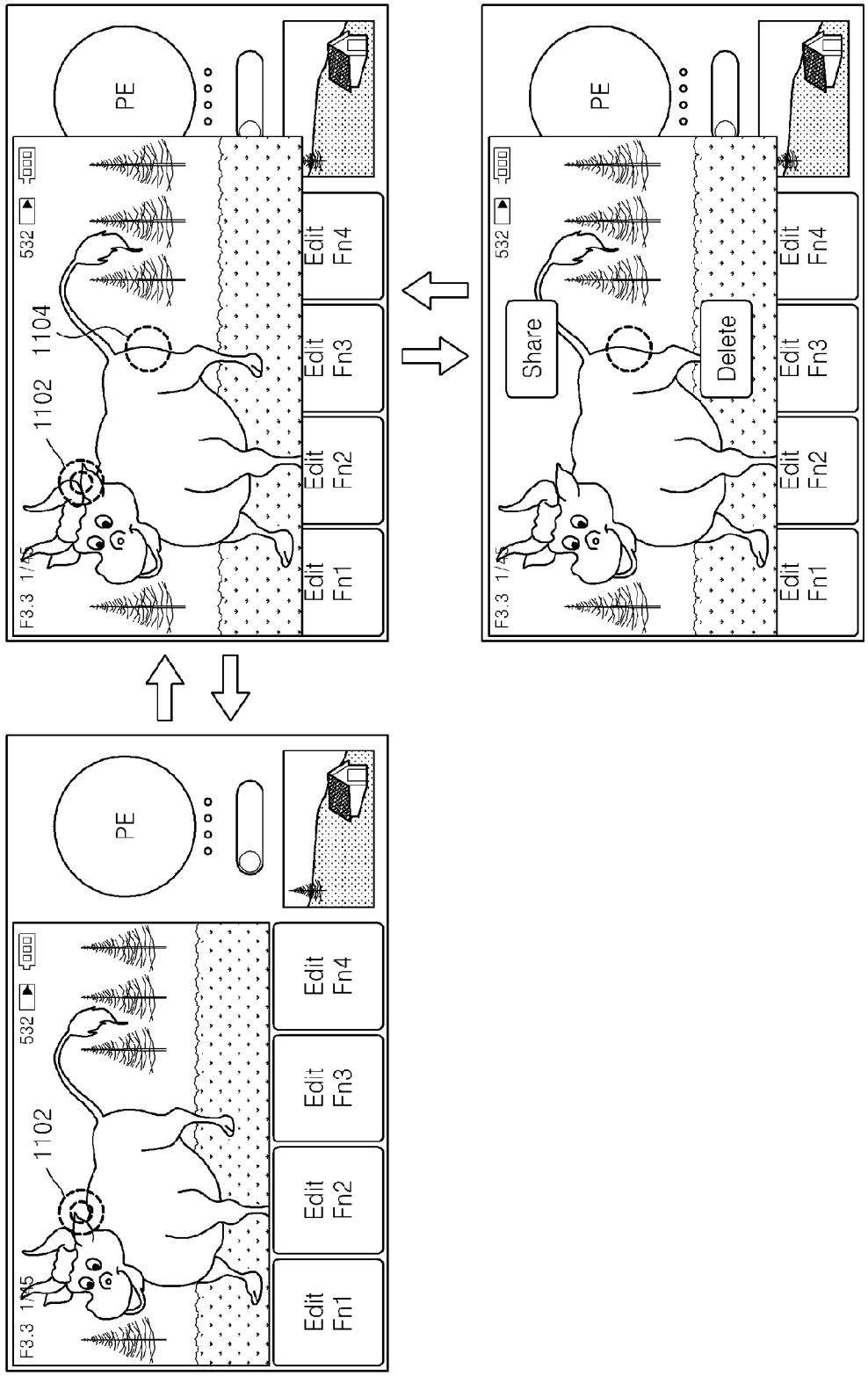
FIG. 11 illustrates UI screens for providing a menu in a display region, according to an exemplary embodiment of the invention.

FIG. 11 illustrates UI screens for providing a menu in the display region DP, according to an exemplary embodiment of the invention.

According to the current embodiment of the invention, a predetermined menu may be provided in the display region DP. In reproduction mode, for example, a magnification/contraction menu, a display region movement menu, a share menu, a delete menu, and a reproduced image change menu may be provided in the display region DP. In addition, in capturing mode, for example, an Auto Focusing (AF) area setting menu and a photometry area setting menu may be provided in the display region DP. The menus provided in the display region DP may be pre-set or set by the user.

FIG. 11 shows an example of providing predetermined menus in the display region DP in reproduction mode. In reproduction mode, the user may touch a point 1102 in the display region DP to magnify or contract a reproduced image. In addition, by touching another point 1104 in the display region DP, a share menu and a delete menu may be provided as shown in FIG. 11. For example, the magnification/contraction menu, the share menu, and the delete menu may be always provided in the display region DP in reproduction mode. As another example, the magnification/contraction menu, the share menu, and the delete menu may be temporarily displayed when the user touches the predetermined point 1104 in the display region DP.

Figure 12:
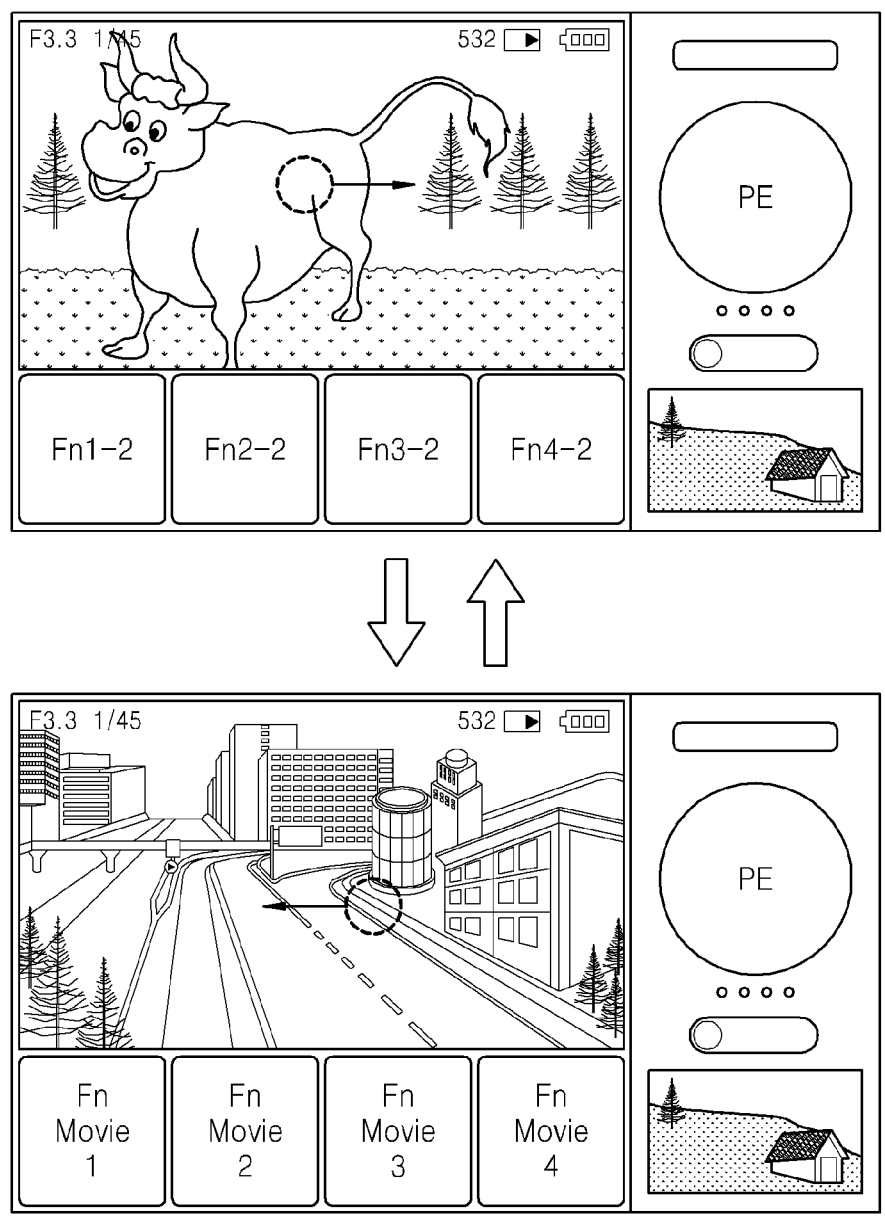
FIG. 12 illustrates UI screens for changing a reproduced image, according to an exemplary embodiment of the invention.

FIG. 12 illustrates UI screens for changing a reproduced image, according to an exemplary embodiment of the invention.

According to the current embodiment of the invention, the user may perform a drag action in a predetermined direction in the display region DP in reproduction mode to reproduce a previous image or a subsequent image. This reproduced image change may be possible in both a state where a reproduced image is magnified and a state where a reproduced image is contracted.

Figure 13:
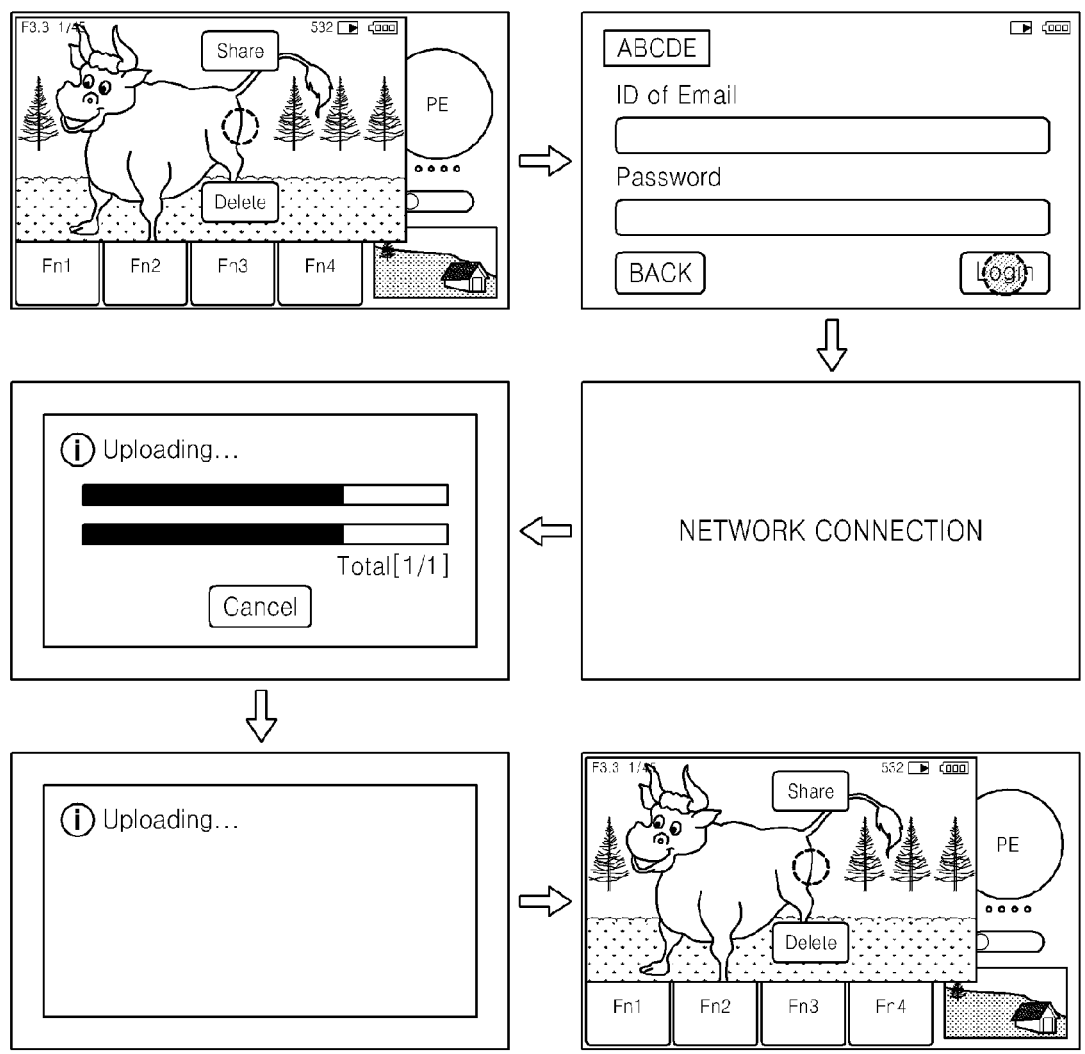
FIG. 13 illustrates UI screens for sharing a reproduced image using a share menu, according to an exemplary embodiment of the invention.

FIG. 13 illustrates UI screens for sharing a reproduced image using the share menu, according to an exemplary embodiment of the invention.

According to the current embodiment of the invention, the user may upload or transmit an image to a web page or through e-mail, using the share menu. As shown in FIG. 13, if the user selects the share menu, a window for inputting an identification of e-mail and a password may pop up, and when the inputting is finished, an operation of uploading the image through a network connection may be performed.

Figure 14:
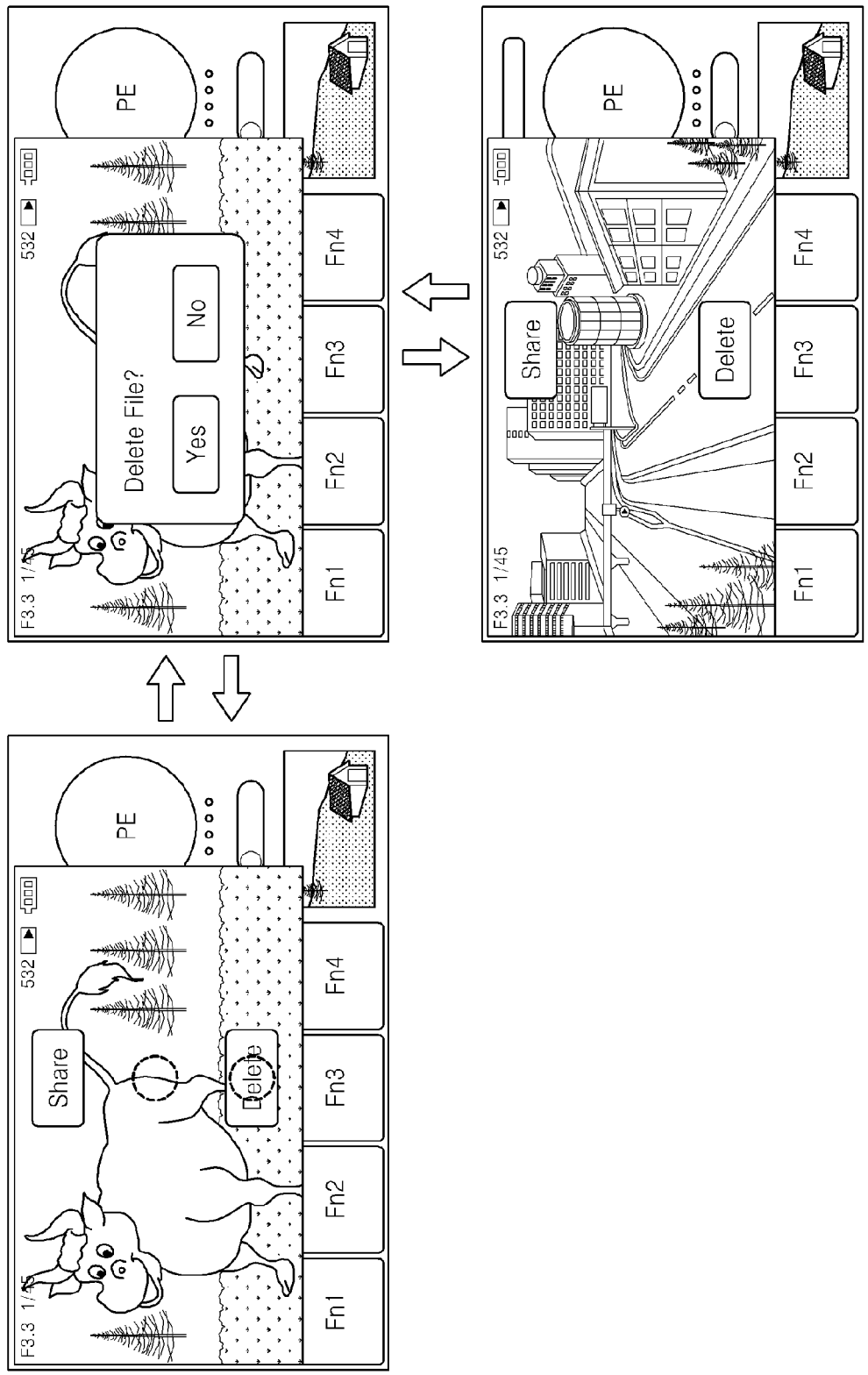
FIG. 14 illustrates UI screens for deleting a reproduced image using a delete menu, according to another exemplary embodiment of the invention.

FIG. 14 illustrates UI screens for deleting a reproduced image using the delete menu, according to another exemplary embodiment of the invention.

According to the current embodiment of the invention, the user may delete a reproduced image using the delete menu that pops up in the display region DP during reproduction as shown in FIG. 14.

As described above, by providing intuitive menus associated with a live-view image or a reproduced image in the display region DP, the user may easily and quickly perform a desired operation, thereby increasing user convenience.

Figure 15:
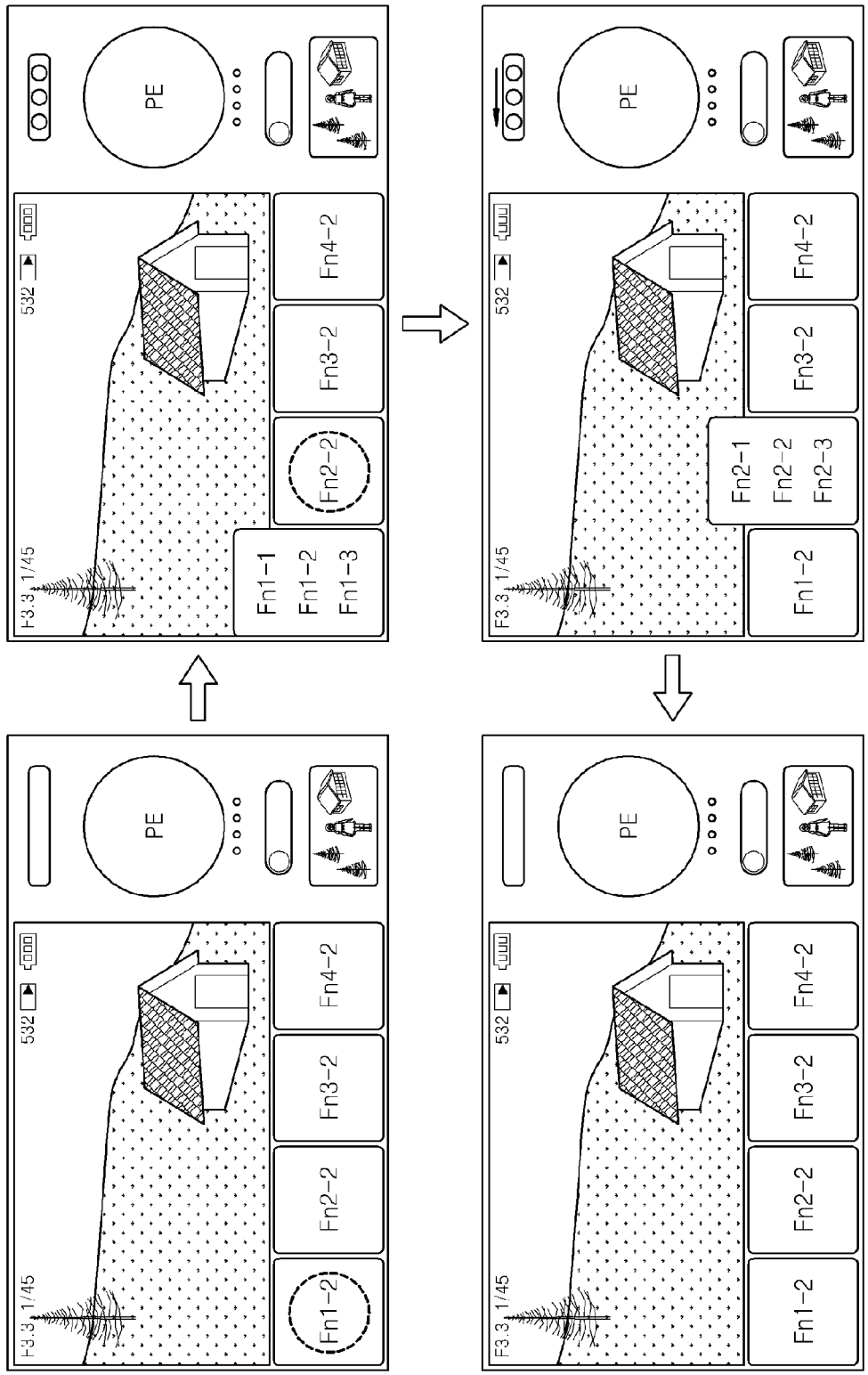
FIG. 15 illustrates UI screens for operating user set menus in a second region, according to an exemplary embodiment of the invention.

FIG. 15 illustrates UI screens for operating user set menus in the second region R2, according to an exemplary embodiment of the invention.

According to the current embodiment of the invention, user set menus in the second region R2 may be enabled and magnified when the user touches a corresponding user set menu. For example, as shown in FIG. 15, if the user selects the Fn1 menu, the Fn1 menu is enabled and magnified, and parameters Fn1-1, Fn1-2, and Fn1-3 selectable in the Fn1 menu are displayed in the Fn1 menu. If the user touches the Fn2 menu in a state where the Fn1 menu is enabled, the Fn1 menu is disabled, the Fn2 menu is enabled, and parameters Fn2-1, Fn2-2, and Fn2-3 selectable in the Fn2 menu are displayed in the Fn2 menu. Any menu enabled in the second region R2 may be disabled again if there is no user input for a predetermined time.

Figure 16:
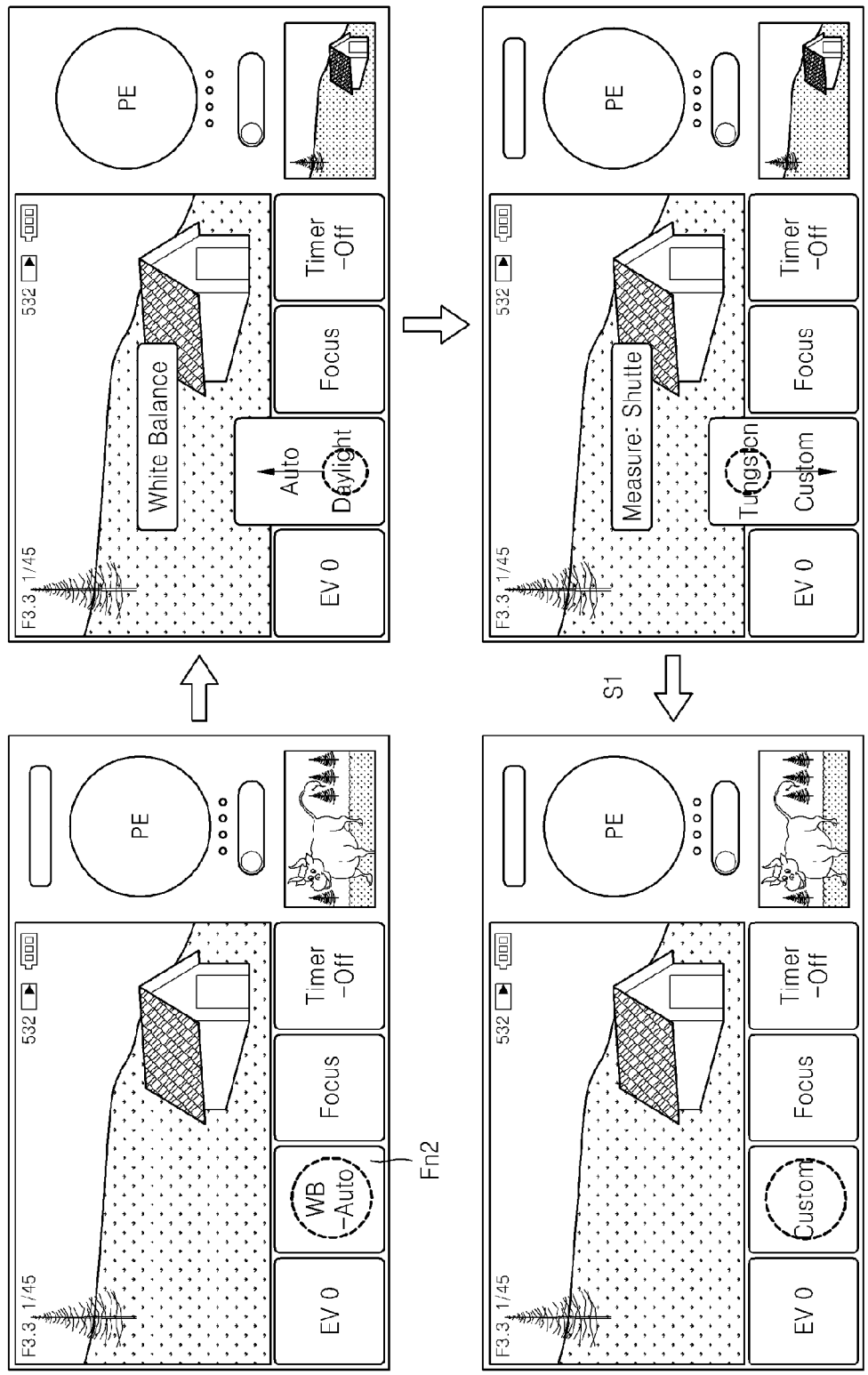
FIG. 16 illustrates UI screens for automatically setting the user set menus in the second region using a shutter release input, according to an exemplary embodiment of the invention.

FIG. 16 illustrates UI screens for automatically setting the user set menus in the second region R2 using a shutter release input, according to an exemplary embodiment of the invention.

According to the current embodiment of the invention, if a half-shutter press S1 is input in a state where at least one user set menu in the second region R2 is enabled, a photograph setting value corresponding to the at least one enabled user set menu may be automatically set. For example, as shown in FIG. 16, the user may select the Fn2 menu to enable the Fn2 menu for setting a white balance in order to select one of various white balance parameters. At this time, if the half-shutter press S1 is input, the CPU/DSP 170 may calculate and set an optimal white balance parameter. The user may easily set any one photograph setting value, using such a function.

Figure 17:
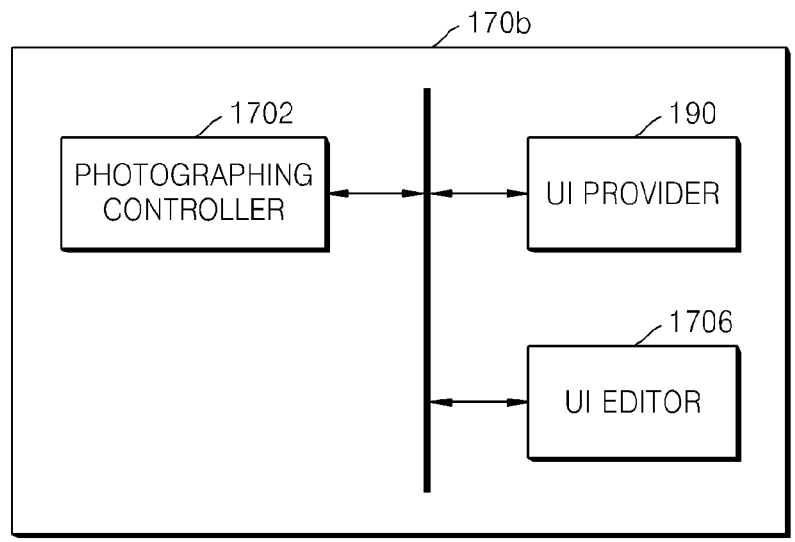
FIG. 17 is a block diagram illustrating a structure of a central processing unit (CPU)/digital signal processor (DSP), according to an exemplary embodiment of the invention.

FIG. 17 is a block diagram illustrating a structure of a CPU/DSP 170b, according to an exemplary embodiment of the invention.

Referring to FIG. 17, the CPU/DSP 170b includes a photographing controller 1702, the UI provider 190, and a UI editor 1706.

The photographing controller 1702 determines setting values of the photographing unit 110 and outputs control signals to the lens driver 112, the iris driver 115, and the image pickup device controller 119 in the photographing unit 110 to control the photographing unit 110.

The UI provider 190 provides the UIs described above through a touch screen.

The UI editor 1706 provides an editing interface for editing the UI provided from the UI provider 190. Hereinafter, the editing interface is described with reference to FIGS. 18 to 20.

Figure 18:
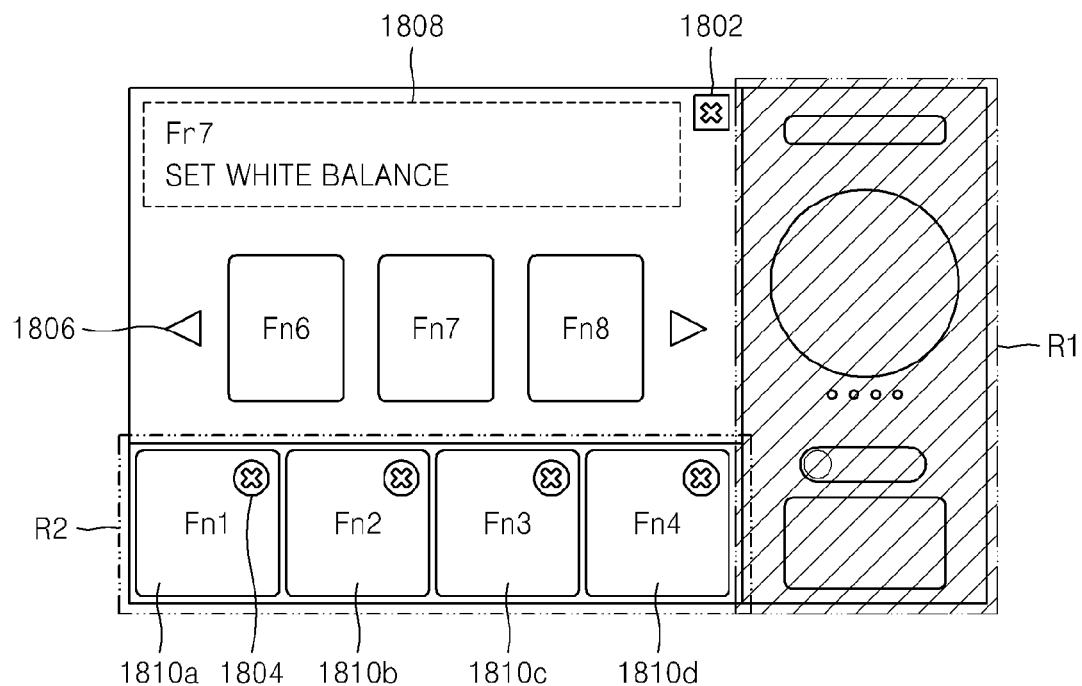
FIG. 18 illustrates a UI edit screen for editing the second region of FIG. 2, according to an exemplary embodiment of the invention.

FIG. 18 illustrates a UI editing screen for editing the second region R2, according to an exemplary embodiment of the invention.

The user may open the UI editing screen to change types of user set menus 1810a, 1810b, 1810c, and 1810d provided in the second region R2. For example, the user may touch for a relatively long period of time at least one of the user set menus 1810a, 1810b, 1810c, and 1810d displayed in the second region R2 to enter the screen for editing the second region R2.

According to the current embodiment of the invention, if the user opens the screen for editing the second region R2, the first region R1 is disabled, and candidate menus Fn6, Fn7, and Fn8 of the second region R2, which can be added to the second region R2, may be provided in the display region DP, as shown in FIG. 18. A delete menu 1804 may be displayed in each of the user set menus 1810a, 1810b, 1810c, and 1810d displayed in the second region R2. The user may, for example, select the delete menu 1804 of a specific user set menu or drag and drop the specific user set menu into the display region DP to exclude the specific user set menu from the second region R2. In addition, the user may, for example, select any one of the candidate menus Fn6, Fn7, and Fn8 of the second region R2 in the display region DP in a predetermined manner or drag and drop any one of the candidate menus Fn6, Fn7, and Fn8 into the second region R2 to add the selected or dropped candidate menu to the second region R2.

According to the current embodiment of the invention, when the user selects any one of the user set menus 1810*a*, 1810*b*, 1810*c*, and 1810*d* in the second region R2 or any one of the candidate menus Fn6, Fn7, and Fn8 of the second region R2, a description corresponding to the selected menu may be provided in a predetermined region 1808. In addition, the user may move the candidate menus Fn6, Fn7, and Fn8 of the second region R2 using a menu movement button 1806 to review selectable candidate menus of the second region R2. The user may select an editing interface end menu 1802 to end the editing interface.

The number of user set menus in the second region R2 may be limited. When the user moves a selected candidate menu of the second region R2 to an existing user set menu in the second region R2 in a state where user set menus are full in the second region R2, the existing user set menu and the selected candidate menu may be exchanged.

Figure 19:
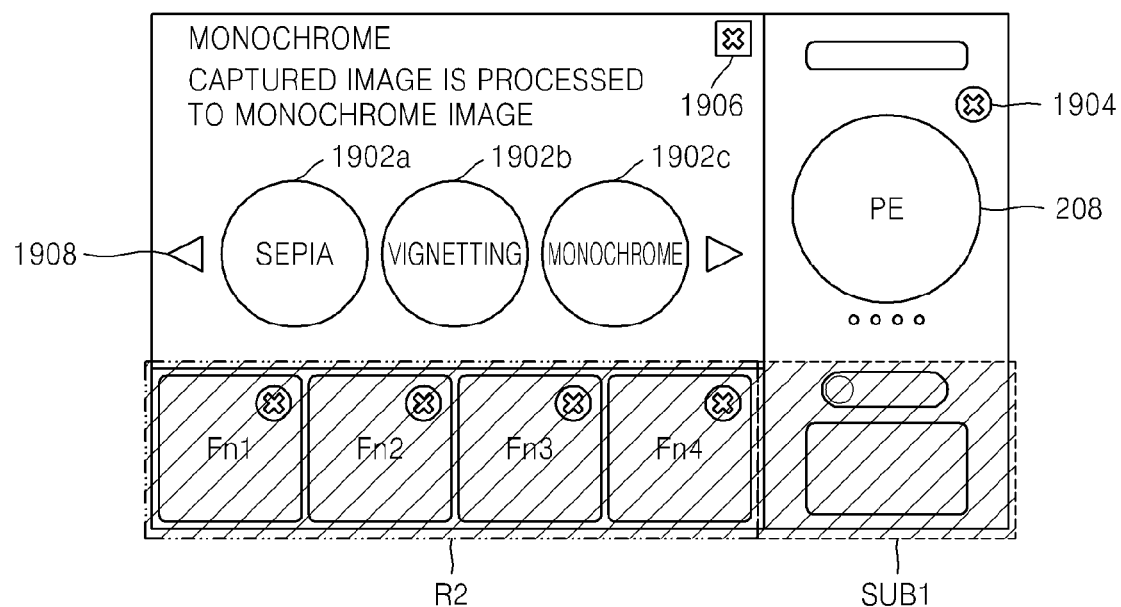
FIG. 19 illustrates a UI edit screen for editing the second sub-region of FIG. 2, according to an exemplary embodiment of the invention.

FIG. 19 illustrates a UI edit screen for editing the second sub-region SUB2, according to an exemplary embodiment of the invention.

The user may enter into the UI edit screen for editing the second sub-region SUB2 to change types of parameters selectable in the menus provided in the second sub-region SUB2. FIG. 19 is described based on an embodiment of changing types of parameters selectable in the photographic effect setting menu 208. For example, the user may touch the photographic effect setting menu 208 for a relatively long period of time to open the screen for editing the second sub-region SUB2.

According to the current embodiment of the invention, when the user opens the UI screen for editing the second sub-region SUB2, the second region R2 and the first sub-region SUB1 may be disabled, and candidate photographic effects 1902*a*, 1902*b*, and 1902*c* addable to the second sub-region SUB2 may be provided in the display region DP. In addition, a delete menu 1904 may be displayed in the photographic effect setting menu 208. The user may, for example, select the delete menu 1904 or drag and drop a photographic effect currently set in the photographic effect setting menu 208 into the display region DP to exclude the photographic effect set in the photographic effect setting menu 208 from the photographic effect setting menu 208. In addition, the user may, for example, select any one of the candidate photographic effects 1902*a*, 1902*b*, and 1902*c* in the display region DP in a predetermined manner or drag and drop any one of the candidate photographic effects 1902*a*, 1902*b*, and 1902*c* into the photographic effect setting menu 208 to add the selected or dropped candidate photographic effect to the photographic effect setting menu 208.

According to the current embodiment of the invention, when the user selects a photographic effect from the photographic effect setting menu 208 or selects a candidate photographic effect, a description corresponding to the selected photographic effect may be provided in a predetermined region. In addition, the user may move the candidate photographic effects 1902*a*, 1902*b*, and 1902*c* using a menu movement button 1908 to read a description corresponding to selectable candidate photographic effects. The user may select an editing interface end menu 1906 to end the editing interface.

The number of photographic effects selectable in the photographic effect setting menu 208 may be limited. When the user moves a candidate photographic effect to the photographic effect setting menu 208 in a state where photographic effects selectable in the photographic effect setting menu 208 are full, a currently set photographic effect and the candidate photographic effect may be exchanged.

Figure 20:
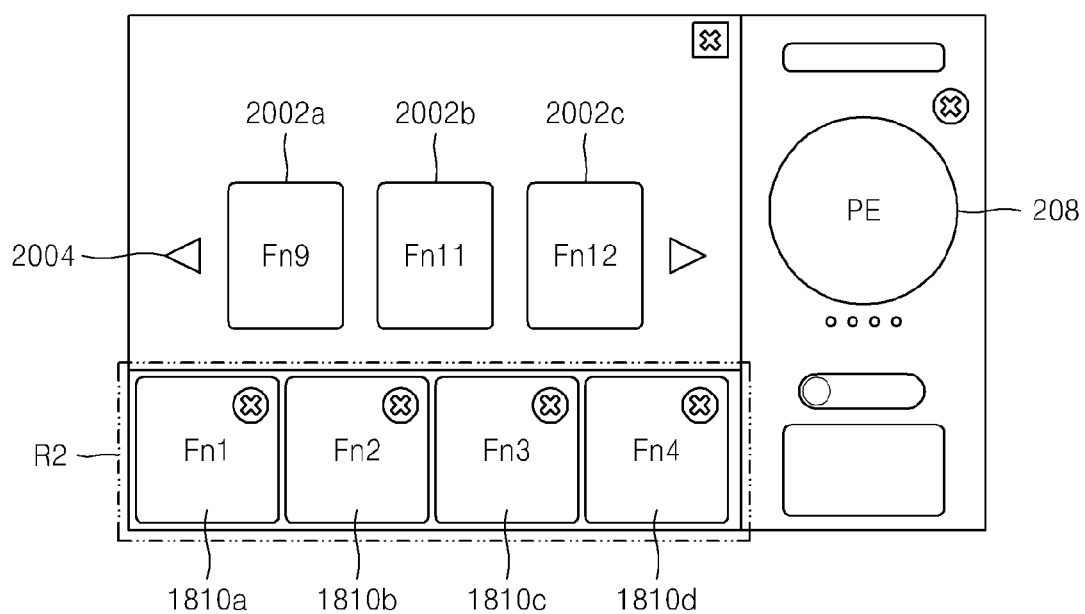
FIG. 20 illustrates a UI edit screen for editing the second region of FIG. 2, according to another exemplary embodiment of the invention.

FIG. 20 illustrates a UI edit screen for editing the second region R2, according to another exemplary embodiment of the invention.

According to the current embodiment of the invention, candidate menus 2002*a*, 2002*b*, and 2002*c* of the second region R2 provided in the display region DP may be differently provided according to a setting value of the photographic effect setting menu 208. For example, the user may set the photographic effect setting menu 208 to a first photographic effect to select one of user set menus in the second region R2 to be provided in the first photographic effect, and then may add a predetermined user set menu or delete any one of the user set menus to or from the second region R2. At this time, if the user selects another photographic effect from the photographic effect setting menu 208, user set menus 1810*a*, 1810*b*, 1810*c*, and 1810*d* provided in the selected photographic effect are provided in the second region R2, and candidate menus 2002*a*, 2002*b*, and 2002*c* of the second region R2 corresponding to the selected photographic effect are provided in the display region DP. In addition, the user may move the candidate menus 2002*a*, 2002*b*, and 2002*c* of the second region R2 using a menu movement button 2004 to read candidate menus selectable in a current photographic effect.

Figure 21:
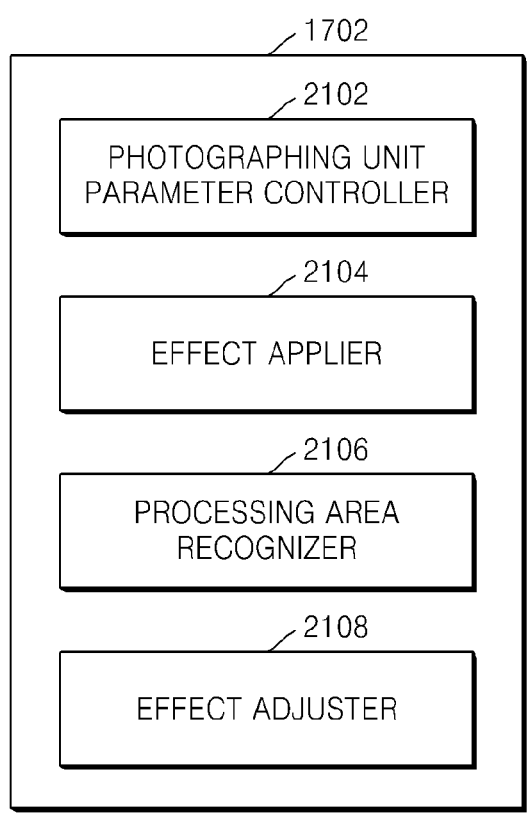
FIG. 21 is a block diagram illustrating a structure of a photographing controller, according to an exemplary embodiment of the invention.

FIG. 21 is a block diagram illustrating a structure of the photographing controller 1702, according to an exemplary embodiment of the invention.

According to the current embodiment of the invention, when the user adjusts setting values through the UI according to any of the above-described embodiments in capturing mode or reproduction mode, the adjusted setting values may be applied in real-time to a live-view image or a reproduced image in the display region DP. Accordingly, the user may change a setting value while directly perceiving a result according to the changed setting value, thereby providing a very intuitive and convenient interface.

According to the current embodiment of the invention, when the user changes a setting value, parameters of the photographing unit 110 are first changed to be most suitable for the changed setting value, and an image generated by the photographing unit 110 is processed in a software manner. Accordingly, a more natural result image can be obtained than with a configuration of changing a setting value in only a software manner. For example, the photographing controller 1702 may change parameters of the photographing unit 110 by changing a photographic effect in the photographic effect setting menu 208. Hereinafter, a description is given based on parameters of the photographing unit 110 being changed by changing a photographic effect.

Referring to FIG. 21, the photographing controller 1702 includes a photographing unit parameter controller 2102, an effect applier 2104, a processing area recognizer 2106, and an effect adjuster 2108.

When the user changes a photographic effect with the UI, the photographing unit parameter controller 2102 searches for or determines optimal parameters of the photographing unit 110 corresponding to the changed photographic effect and applies the optimal parameters to the photographing unit 110. For example, the photographing unit parameter controller 2102 may change an iris value for an out-focusing effect or adjust an angle of view for a fisheye lens effect. In addition, the photographing unit parameter controller 2102 may adjust a range of cropping in the image pickup device 118 to utilize a dead space of the image pickup device 118 to apply a vignetting effect.

The effect applier 2104 generates a result image to which the set photographic effect is applied by software processing a captured image generated by the photographing unit 110 under control of the photographing unit parameter controller 2102.

The processing area recognizer 2106 recognizes a processing area to be processed for photographic effect adjustment by comparing an existing image before the photographic effect is applied with the result image.

When the user tries to adjust the intensity of the photographic effect with the photographic effect setting menu 208, the effect adjuster 2108 adjusts the intensity of the photographic effect by performing processing corresponding to the photographic effect in the processing area.

Figure 22:
FIG. 22 illustrates an existing image according to an exemplary embodiment of the invention.
Figure 23:
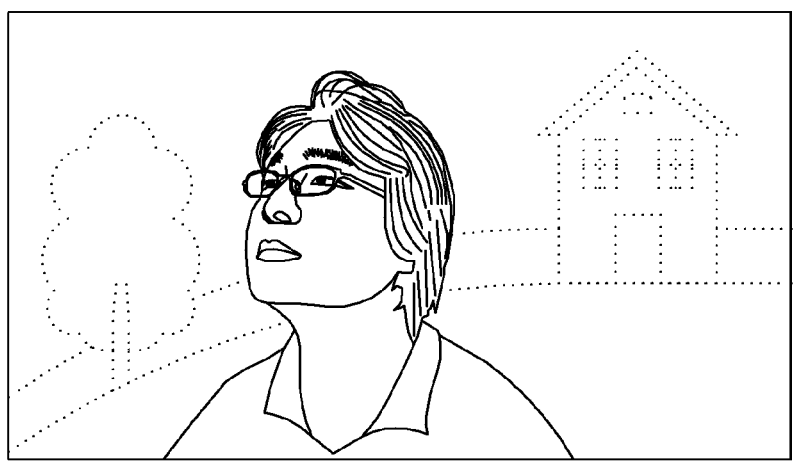
FIG. 23 illustrates a result image showing an out-focusing effect.
Figure 24:
FIG. 24 illustrates a result image showing a fisheye lens effect.
Figure 25:
FIG. 25 illustrates a result image showing a vignetting effect.

FIG. 22 illustrates an existing image according to an exemplary embodiment of the invention, FIG. 23 illustrates a result image showing an out-focusing effect, FIG. 24 illustrates a result image showing a fisheye lens effect, and FIG. 25 illustrates a result image showing a vignetting effect.

In capturing mode, an existing image may be generated by capturing an image before parameters of the photographing unit 110 are changed. As another example, in capturing mode, an existing image may be generated by capturing an image after the parameters of the photographing unit 110 are set to predetermined values or after the photographing unit parameter controller 2102 controls the photographing unit 110.

The processing area recognizer 2106 may recognize a processing area using a differential image between an existing image and a result image.

For example, according to the out-focusing effect of FIG. 23, since a person that is a main subject in the center position will have a small pixel value difference between the existing image and the result image, the person has a relatively small pixel value in a differential image between the existing image and the result image, and since an area except for the person will have a large pixel value difference between the existing image and the result image because of the out-focusing effect, the area except for the person has a relatively large pixel value in the differential image. Accordingly, an area in which a pixel value in the differential image is greater than a predetermined value may be recognized as a processing area.

Similarly, in the fisheye lens effect of FIG. 24, a processing area may be recognized using a differential image between an existing image and a result image; and in the vignetting effect of FIG. 25, a processing area may be recognized using a differential image between an existing image and a result image.

After the differential image is recognized, when the user adjusts the intensity of a corresponding photographic effect, the effect adjuster 2108 may adjust the intensity of the corresponding photographic effect by applying the corresponding photographic effect to the processing area.

Figure 26:
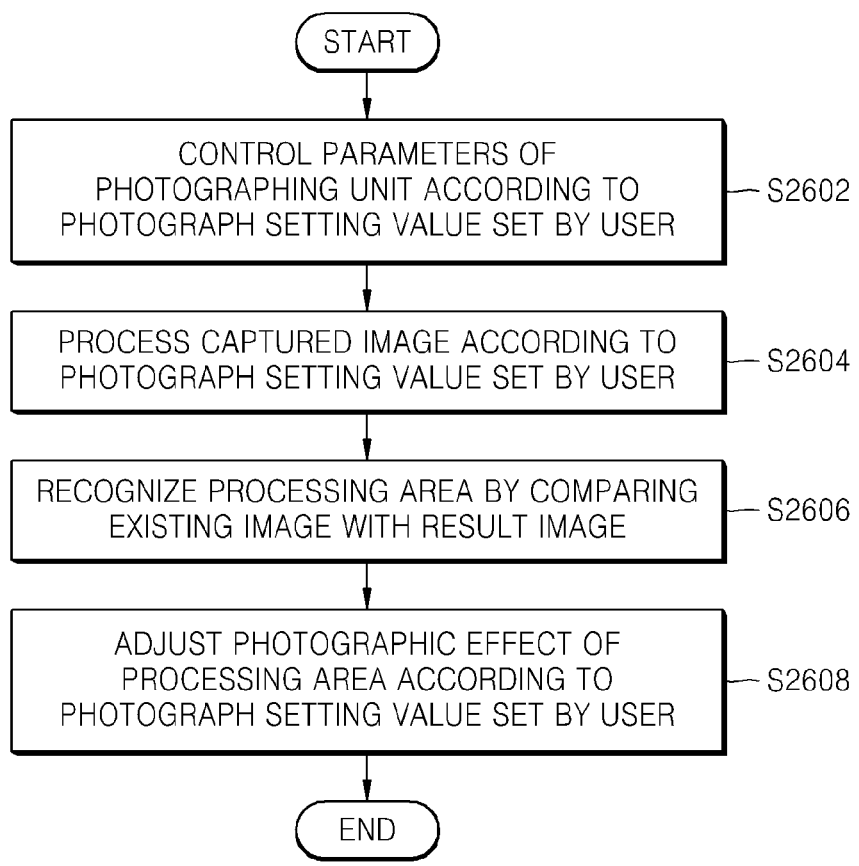
FIG. 26 is a flowchart illustrating a method of controlling a digital photographing apparatus, according to an exemplary embodiment of the invention.

FIG. 26 is a flowchart illustrating a method of controlling a digital photographing apparatus, according to an exemplary embodiment of the invention.

Referring to FIG. 26, the user controls parameters of the photographing unit 110 according to a photograph setting value set through the UI in operation S2602. The photograph setting value may be one of the photographic effects described above. When a captured image is generated by the photographing unit 110 using the parameters of the photographing unit 110, a result image is generated by processing the captured image according to the photograph setting value set by the user in operation S2604. In operation S2606, a processing area to which the photographic effect is applied to adjust the intensity of the photographic effect by comparing the existing (captured) image with the result image is recognized. At this time, the processing area may be calculated using a differential image between the existing image and the result image. When the user inputs a signal for adjusting the photographic effect intensity through the UI, the photographic effect intensity is adjusted by applying a set photographic effect to the processing area in operation S2608.

According to the embodiments of the invention, by providing a UI capable of adaptively and selectively performing various operations, such as photographing, controlling of photograph setting values, and reproduction, on a single UI screen, a user can simply control a digital photographing apparatus without complicated operations, thereby enhancing user convenience.

In addition, by providing a UI for actively changing menus of the user interface according to setting values input by the user, a convenient and compact UI may be provided to the user.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital photographing apparatus comprising a user interface provider for providing a user interface comprising:
    a display region for displaying a live-view image or a reproduced image;
    a first region for providing at least one pre-set menu, wherein the types of the at least one pre-set menu are unchangeable;
    a second region for providing at least one user-set menu, wherein the types of the at least one user-set menu and the number of at least one user-set menu are set by a user; and
    a user interface editor providing an editing interface for editing the at least one user-set menu,
    wherein, when the at least one user-set menu is edited, the user interface editor provides an addable candidate menu to the second region in the display region and changes menus in the second region according to a user input.

2. The digital photographing apparatus of claim 1, wherein the first region comprises:
    a first sub-region including at least one of a first selection menu for selecting a capturing mode or a reproduction mode, or a second selection menu for selecting a still image capturing mode or a video capturing mode; and
    a second sub-region including at least one pre-set menu according to a current menu setting of the first sub-region.

3. The digital photographing apparatus of claim 1, wherein types of the at least one user-set menu to be provided in the second region are determined according to the current menu setting of the first region.

4. The digital photographing apparatus of claim 1, wherein the first region comprises a photographic effect setting menu for setting a currently set photographic effect, and wherein the second region comprises:
    a third sub-region for providing a user-set menu of the at least one user-set menu determined according to the currently set photographic effect; and
    a fourth sub-region for providing a user-set menu of the at least one user-set menu disposed regardless of the currently set photographic effect.

5. The digital photographing apparatus of claim 4, wherein the currently set photographic effect is a lens effect or a filter effect to be applied to a captured image, and
    the user-set menu of the at least one user-set menu in the third sub-region is a menu for selecting a photograph setting value to be set as the currently set photographic effect.

6. The digital photographing apparatus of claim 4, wherein the at least one user-set menu in the fourth sub-region includes at least one of a smart shutter for performing photographing with photograph setting values pre-selected by the user, a reset button for setting photograph setting values to initial values, or a folder selection menu for selecting and changing a folder in which a captured image is stored or that is searched for a reproduced image.

7. The digital photographing apparatus of claim 4, further comprising:
    a capturing unit for concentrating an optical signal and converting the optical signal to an electrical signal; and
    a capturing controller for changing parameters of the capturing unit to pre-set values according to the currently set photographic effect.

8. The digital photographing apparatus of claim 1, wherein the first region comprises a first selection menu for selecting a capturing mode or a reproduction mode,
    the first selection menu displays at least one image stored in the digital photographing apparatus in the capturing mode and displays the live-view image in the reproduction mode, and
    the display region displays the live-view image in the capturing mode and displays the at least one image stored in the digital photographing apparatus in the reproduction mode.

9. The digital photographing apparatus of claim 1, wherein the user interface provider provides a share menu and a delete menu overlaid on the reproduced image when the reproduced image is displayed in the display region.

10. The digital photographing apparatus of claim 1, wherein the user interface editor determines and provides the addable candidate menu according to a current menu setting of the first region.

11. The digital photographing apparatus of claim 1, wherein the user interface is provided through a touch screen.

12. A method of controlling a digital photographing apparatus comprising a user interface, a screen of the user interface comprising a display region, a first region, and a second region, the method comprising:
displaying a live-view image or a reproduced image in the display region;
providing at least one pre-set menu in the first region, wherein the types of the at least one pre-set menu are unchangeable;
providing at least one user-set menu in the second region, wherein the types of the at least one user-set menu and the number of at least one user-set menu are set by a user;
providing an editing interface for editing the at least one user-set menu;
when the at least one user-set menu is edited, providing an addable candidate menu to the second region in the display region; and
changing menus in the second region according to a user input.

13. The method of claim 12, wherein the first region comprises:
a first sub-region including at least one of a first selection menu for selecting a capturing mode or a reproduction mode, or a second selection menu for selecting a still image capturing mode or a video capturing mode; and
a second sub-region including at least one pre-set menu according to a current menu setting of the first sub-region.

14. The method of claim 12, further comprising determining types of the at least one user-set menu to be provided in the second region according to the current menu setting of the first region.

15. The method of claim 12, further comprising providing a photographic effect setting menu for setting a currently set photographic effect in the first region, wherein the second region comprises:
a third sub-region for providing a user-set menu of the at least one user-set menu determined according to the currently set photographic effect; and
a fourth sub-region for providing a user-set menu of the at least one user-set menu disposed regardless of the currently set photographic effect.

16. The method of claim 15, wherein the currently set photographic effect is a lens effect or a filter effect to be applied to a captured image, and
the user-set menu of the at least one user set menu in the third sub-region is a menu for selecting a photograph setting value to be set as the currently set photographic effect.

17. The method of claim 15, wherein the at least one user-set menu in the fourth sub-region is at least one of a smart shutter for performing photographing with photograph setting values pre-selected by the user, a reset button for setting photograph setting values to initial values, or a folder selection menu for selecting and changing a folder in which a captured image is stored or that is searched to locate a reproduced image.

18. The method of claim 15, further comprising changing parameters of a capturing unit to pre-set values according to the currently set photographic effect.

19. The method of claim 12, wherein the first region comprises a first selection menu for selecting a capturing mode or a reproduction mode,
the first selection menu displays at least one image stored in the digital photographing apparatus in the capturing mode and displays the live-view image in the reproduction mode, and
the display region displays the live-view image in the capturing mode and displays the at least one image stored in the digital photographing apparatus in the reproduction mode.

20. The method of claim 12, further comprising providing a share menu and a delete menu, overlaid on the reproduced image when the reproduced image is displayed in the display region.

21. The method of claim 12, further comprising determining the candidate menu according to a current menu setting of the first region.

22. The method of claim 12, further comprising presenting the user interface on a touch screen.

23. A non-transitory computer-readable storage medium storing computer program codes that, when executed, cause a digital photographing apparatus to present a user interface including a display region, a first region, and a second region by at least:
displaying a live-view image or a reproduced image in the display region;
providing at least one pre-set menu in the first region, wherein the types of the at least one pre-set menu are unchangeable;
providing at least one user-set menu in the second region, wherein the types of the at least one user-set menu and the number of at least one user-set menu are set by a user;
providing an editing interface for editing the at least one user-set menu;
when the at least one user-set menu is edited, providing an addable candidate menu to the second region in the display region; and
changing menus in the second region according to a user input.

* * * * *